(12) United States Patent
Chen et al.

(10) Patent No.: US 12,132,891 B2
(45) Date of Patent: *Oct. 29, 2024

(54) INTER PREDICTION METHOD AND APPARATUS

(71) Applicant: HUAWEI TECHNOLOGIES CO., LTD., Guangdong (CN)

(72) Inventors: Xu Chen, Shenzhen (CN); Jianhua Zheng, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/365,083

(22) Filed: Aug. 3, 2023

(65) Prior Publication Data
US 2024/0048686 A1 Feb. 8, 2024

Related U.S. Application Data

(63) Continuation of application No. 17/226,289, filed on Apr. 9, 2021, now Pat. No. 11,765,343, which is a
(Continued)

(51) Int. Cl.
*H04N 7/12* (2006.01)
*H04N 19/105* (2014.01)
(Continued)

(52) U.S. Cl.
CPC ......... *H04N 19/105* (2014.11); *H04N 19/139* (2014.11); *H04N 19/147* (2014.11);
(Continued)

(58) Field of Classification Search
CPC .. H04N 19/105; H04N 19/139; H04N 19/147; H04N 19/172; H04N 19/176;
(Continued)

(56) References Cited

U.S. PATENT DOCUMENTS 10,362,330 B1 * 7/2019 Li ........................ H04N 19/44
10,440,378 B1 10/2019 Xu et al.
(Continued)

FOREIGN PATENT DOCUMENTS

AU 2016228184 A1 9/2016
CN 103931196 A 7/2014
(Continued)

OTHER PUBLICATIONS

ITU-T, H.265, Series H: Audiovisual and Multimedia Systems Infrastructure of audiovisual services Coding of moving video, High efficiency video coding, Telecommunication Standardization Sector of ITU, (Feb. 2018), 692 pages.
(Continued)

*Primary Examiner* — Gims S Philippe
(74) *Attorney, Agent, or Firm* — WOMBLE BOND DICKINSON (US) LLP

(57) ABSTRACT

Methods and apparatuses for inter prediction are disclosed. The method comprises: constructing a merging candidate list of a current picture block; when a number of merging candidates in the merging candidate list is less than a maximum number of candidates minus N, adding at least one history-based motion vector predictor (HMVP) candidate to the merging candidate list to obtain a new merging candidate list, wherein N is a positive integer; obtaining motion information of the current picture block based on the new merging candidate list; and determining a predicted block of the current picture block based on the motion information of the current picture block.

8 Claims, 10 Drawing Sheets

Related U.S. Application Data continuation of application No. PCT/CN2019/110488, filed on Oct. 10, 2019.

(60) Provisional application No. 62/744,106, filed on Oct. 10, 2018.

(51) Int. Cl.
  *H04N 19/139* (2014.01)
  *H04N 19/147* (2014.01)
  *H04N 19/172* (2014.01)
  *H04N 19/176* (2014.01)
  *H04N 19/52* (2014.01)

(52) U.S. Cl.
  CPC ......... *H04N 19/172* (2014.11); *H04N 19/176* (2014.11); *H04N 19/52* (2014.11)

(58) Field of Classification Search
  CPC ...... H04N 19/52; H04N 19/196; H04N 19/46; H04N 19/513; H04N 19/42; H04N 19/567
  See application file for complete search history.

(56) References Cited

U.S. PATENT DOCUMENTS

| | | |
|---|---|---|
| 10,491,902 B1 | 11/2019 | Xu et al. |
| 11,172,194 B2* | 11/2021 | Lee ............... H04N 19/176 |
| 2013/0077689 A1 | 3/2013 | Lim et al. |
| 2013/0114717 A1 | 5/2013 | Zheng et al. |
| 2014/0161186 A1 | 6/2014 | Zhang et al. |
| 2014/0301461 A1 | 10/2014 | Jeon et al. |
| 2015/0085930 A1 | 3/2015 | Zhang et al. |
| 2015/0382014 A1 | 12/2015 | Kim et al. |
| 2017/0006302 A1 | 1/2017 | Lee et al. |
| 2017/0099495 A1 | 4/2017 | Rapaka et al. |
| 2018/0152710 A1 | 5/2018 | Oh et al. |
| 2020/0014948 A1* | 1/2020 | Lai ............... H04N 19/139 |
| 2020/0059658 A1* | 2/2020 | Chien ............ H04N 19/176 |
| 2020/0077084 A1* | 3/2020 | Li ................. H04N 19/52 |
| 2020/0112716 A1 | 4/2020 | Han et al. |
| 2020/0112741 A1 | 4/2020 | Han et al. |
| 2020/0112743 A1* | 4/2020 | Xu ................ H04N 19/521 |
| 2020/0137398 A1* | 4/2020 | Zhao ............. H04N 19/517 |
| 2020/0186820 A1 | 6/2020 | Park et al. |
| 2020/0260072 A1 | 8/2020 | Park et al. |
| 2021/0400298 A1 | 12/2021 | Zhao et al. |

FOREIGN PATENT DOCUMENTS

| | | |
|---|---|---|
| RU | 2577779 C2 | 3/2016 |
| WO | 2017039117 A1 | 3/2017 |
| WO | 2017043734 A1 | 3/2017 |
| WO | 2018066959 A1 | 4/2018 |

OTHER PUBLICATIONS

Yu-Ling Hsiao et al., CE4.4.12: Pairwise average candidates, oint Video Experts Team (JVET) of ITU-T SG 16 WP 3 and ISO/IEC JTC 1/SC 29/WG 1112th Meeting: Macao, CN, 3 Oct. 12, 2018, Document: JVET-L0090-v2, 18 pages.

Document: JVET-L0266-v2 , Li Zhang et al., CE4: History-based Motion Vector Prediction (Test 4.4.7), Joint Video Experts Team (JVET) of ITU-T SG 16 WP 3 and 1S0/IEC JTC 1/SC 29/WG11, 12th Meeting: Macao, CN, Oct. 3-12, 2018, Total 7 pages.

Document: JVET-L0266-v1, Li Zhang et al., Suggested specification changes for JVET-L0266, Joint Video Experts Team (JVET) of ITU-T SG 16 WP 3 and ISO/IEC JTC 1/SC 29/WG 11, 12th Meeting: Macao, CN, Oct. 3-12, 2018, total 6 pages, XP030250949.

Wd, H.266/VVC Related Techniques Learning Note 19: HMVP Techniques in Interframe Prediction (Historical MV Prediction), https://blog.csdn.net/Peter_Red_Boy/article/details/100355049?pps_request_misc=andrequest_id=andbiz_id=102andutm_term=H.226/VVC%20related%20technology%20sandutm_medium=distribute.pc_search_result.none-task-blog-2~all~sobaiduweb~default-0-100355049.nonecaseandspm=1018.2226.3001.4187, Sep. 2, 2019, 4 pages.

Chun-Chi Chen, et. al., Generalized bi-prediction for inter coding, Joint Video Exploration Team (JVET) of ITU-T SG 16 WP 3 and ISO/IEC JTC 1/SC 29/WG 11 3rd Meeting: Geneva, CH, JVET-C0047 (released on May 26 through Jun. 1, 2016) total: 4 pages.

* cited by examiner

INTER PREDICTION METHOD AND APPARATUS

CROSS REFERENCE TO RELATED APPLICATIONS

This application is a continuation of U.S. patent application Ser. No. 17/226,289, filed on Apr. 9, 2021, which is a continuation of International Application No. PCT/CN2019/110488, filed on Oct. 10, 2019, which claims priority to U.S. Provisional Application No. 62/744,106, filed on Oct. 10, 2018. All of the afore-mentioned patent applications are hereby incorporated by reference in their entireties.

TECHNICAL FIELD

The present disclosure relates to the field of video encoding and decoding, and in particular, to an inter prediction method and apparatus for a video image, and a corresponding encoder and decoder.

BACKGROUND

Digital video capabilities can be incorporated into a wide variety of apparatuses, including digital televisions, digital live broadcast systems, wireless broadcast systems, personal digital assistants (PDA), laptop or desktop computers, tablet computers, e-book readers, digital cameras, digital recording apparatuses, digital media players, video game apparatuses, video game consoles, cellular or satellite radio phones (so-called "smartphones"), video conferencing apparatuses, video streaming apparatuses, and the like. Digital video apparatuses implement video compression technologies, for example, video compression technologies described in standards defined by MPEG-2, MPEG-4, ITU-T H.263, and ITU-T H.264/MPEG-4 Part 10 advanced video coding (AVC), the video coding standard H.265/high efficiency video coding (HEVC) standard, and extensions of such standards. A video apparatus can transmit, receive, encode, decode, and/or store digital video information more efficiently by implementing such video compression technologies.

In the video compression technologies, spatial (intra-image) prediction and/or temporal (inter-image) prediction are/is performed to reduce or remove inherent redundancy in video sequences. For block-based video coding, a video slice (that is, a video frame or a portion of a video frame) may be partitioned into picture blocks, and the picture block may also be referred to as a tree block, a coding unit (CU), and/or a coding node. A picture block in a to-be-intra-coded (I) slice of an image is coded through spatial prediction of reference samples in neighboring blocks in the same image. For a picture block in a to-be-inter-coded (P or B) slice of an image, spatial prediction of reference samples in neighboring blocks in the same image or temporal prediction of reference samples in other reference pictures may be used. The image may be referred to as a frame, and the reference picture may be referred to as a reference frame.

SUMMARY

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments of the disclosure provide an inter prediction method and apparatus for a video image, and a corresponding encoder and decoder, to improve prediction accuracy of motion information of a picture block to some extent, thereby improving encoding and decoding performance.

According to a first aspect, a computer-implemented method for inter prediction in video coding is described. In one embodiment, the method constructs a merge candidate list based on motion information of a coded picture block. The motion information defines a motion vector predictor (MVP) candidate in the merge candidate list. The method adds new motion information as a new MVP candidate to the merge candidate list when a quantity of MVP candidates in the merge candidate list is less than a maximum candidate quantity. The method obtains a merge index of a position of optimum motion information in the merge candidate list. The method obtains the optimum motion information based on the merge index. The method determines a predicted current picture block based on the optimum motion information.

In one embodiment, the coded picture block is spatially or temporally adjacent to a current coding block.

In one embodiment, the optimum motion information is used as motion information of the current coding block.

In one embodiment, the method further determines the optimum motion information from the merge candidate list using a rate-distortion cost.

In one embodiment, when the quantity of MVP candidates in the merge candidate list reaches the maximum candidate quantity, the method further adds pairwise average candidate motion information to the merge candidate list.

In one embodiment, the pairwise average candidate motion information defines a pairwise average candidate generated by averaging a predefined pair of MVP candidates in the merge candidate list.

In one embodiment, the maximum candidate quantity is a maximum candidate quantity of the merge candidate list minus N where N is a positive integer.

In one embodiment, the new motion information is added to the merge candidate list in a predetermined candidate scan order.

In one embodiment, temporal candidate motion information of the coded picture block is obtained after a motion vector of a corresponding position block in a reference frame is scaled based on picture order counts of the reference frame and a current frame.

In one embodiment, the motion information includes at least one of: reference picture information or a motion vector.

In one embodiment, the reference picture information includes at least one of: unidirectional or bidirectional prediction information, a reference picture list, or a reference picture index corresponding to the reference picture list.

In one embodiment, prior to adding the new motion information as the new MVP candidate to the merge candidate list, the method redundancy checks the merge candidate list to find whether there is an identical MVP candidate in the merge candidate list. In response to finding an identical MVP candidate in the merge candidate list, the method removes the identical MVP candidate from the merge candidate list and forward moving remaining MVP candidates in the merge candidate list.

According to a second aspect, an embodiment of this application provides an inter prediction (computer-implemented) method, including: constructing a merge candidate list of a current picture block; when a quantity of candidate motion information in the merge candidate list is less than a maximum candidate quantity of the merge candidate list minus N, adding history-based MVP (HMVP) candidate motion information to the merge candidate list to obtain a new merge candidate list, where N is a positive integer; obtaining a merge index of the current picture block; obtaining motion information of the current picture block based on the new merge candidate list and the merge index; and determining a predicted block of the current picture block based on the motion information of the current picture block.

In an embodiment, the predicted block can be termed a prediction block.

In an embodiment, the current picture block may be a coding block, a coding unit, or a prediction unit.

In an embodiment, the maximum candidate quantity of the merge candidate list can be termed a maximum number of merging motion vector predictor (MVP) candidates.

In an embodiment, the HMVP candidate motion information can be termed history-based merging candidates.

Based on the second aspect, in some embodiments, the method further includes: when a quantity of candidate motion information in the merge candidate list is greater than or equal to a maximum candidate quantity of the merge candidate list minus N, adding pairwise average candidate motion information to the merge candidate list to obtain the new merge candidate list.

Based on the second aspect, in some embodiments, the when a quantity of candidate motion information in the merge candidate list is less than a maximum candidate quantity of the merge candidate list minus N, adding HMVP candidate motion information to the merge candidate list to obtain a new merge candidate list includes: when the quantity of the candidate motion information in the merge candidate list is less than the maximum candidate quantity of the merge candidate list, adding the HMVP candidate motion information to the merge candidate list to obtain a first merge candidate list; and when a quantity of candidate motion information in the first merge candidate list is less than the maximum candidate quantity of the merge candidate list minus N, adding new HMVP candidate motion information to the first merge candidate list to obtain the new merge candidate list.

Based on the second aspect, in some embodiments, the method further includes: when a quantity of candidate motion information in the first merge candidate list is greater than or equal to the maximum candidate quantity of the merge candidate list minus N, adding pairwise average candidate motion information to the first merge candidate list to obtain the new merge candidate list.

According to a third aspect, an embodiment of this application provides an inter prediction apparatus, where the inter prediction apparatus includes functional units for implementing any one of the methods in the first aspect. For example, the inter prediction apparatus may include: a construction unit, configured to construct a merge candidate list of a current picture block, and when a quantity of candidate motion information in the merge candidate list is less than a maximum candidate quantity of the merge candidate list minus N, add HMVP candidate motion information to the merge candidate list to obtain a new merge candidate list, where N is a positive integer; and a prediction block determining unit, configured to obtain a merge index of the current picture block, obtain motion information of the current picture block based on the new merge candidate list and the merge index, and determine a prediction block of the current picture block based on the motion information of the current picture block.

According to a fourth aspect, an embodiment of this application provides an inter prediction (computer-implemented) method, including: constructing a merge candidate list of a current picture block; adding HMVP candidate motion information to the merge candidate list, in a case that a quantity of candidate motion information in the merge candidate list is less than a maximum candidate quantity of the merge candidate list minus N, wherein N is a positive integer; obtaining motion information of the current picture block based on the merge candidate list; and determining a predicted block of the current picture block based on the motion information of the current picture block.

In an embodiment, N may be 1, 2, or 3.

In an embodiment, the obtaining motion information of the current picture block based on the merge candidate list may comprise: obtaining a merge index of the current picture block or a merge index to the merge candidate list; obtaining motion information of the current picture block based on the merge candidate list and the merge index. In an embodiment, the obtaining a merge index of the current picture block or a merge index to the merge candidate list may comprise: obtaining the merge index by parsing a bitstream. In an embodiment, the obtaining motion information of the current picture block based on the merge candidate list and the merge index may comprise: the obtaining motion information from the merge candidate list by using the merge index. In an embodiment, the merge index may be used to indicate the position of the motion information in the merger candidate list.

In an embodiment, the motion information may comprise one or two motion vectors.

In an embodiment, the motion information may further comprise one or two reference picture indices of the one or two reference picture lists related to the one or more motion vectors, unidirectional or bidirectional prediction information, or one or two MVDs (motion vector differences) related to the one or more motion vectors.

In an embodiment, the obtaining motion information of the current picture block based on the merge candidate list may comprise: determining the motion information from the merge candidate list using a rate-distortion cost. In an embodiment, the method may further comprise: encoding a merge index to the merge candidate list in a bitstream.

In an embodiment, the predicted block can be termed a prediction block.

In an embodiment, the current picture block may be a coding block, a coding unit, or a prediction unit.

In an embodiment, the maximum candidate quantity of the merge candidate list can be termed a maximum number of merging motion vector predictor (MVP) candidates.

In an embodiment, the HMVP candidate motion information can be termed history-based merging candidates or history-based MVP (HMVP) merge candidates.

In an embodiment, the method further includes: adding pairwise average candidate motion information to the merge candidate list, in a case that a quantity of candidate motion information in the merge candidate list is equal to a maximum candidate quantity of the merge candidate list minus N.

In an embodiment, the pairwise average candidate motion information are generated by averaging a predefined pair of MVP candidates in the merge candidate list.

In an embodiment, the pairwise average candidate motion information motion information can be termed pairwise average candidates.

According to a fifth aspect, an inter prediction apparatus is described. The inter prediction apparatus includes functional units for implementing any one of the methods in the first aspect. For example, the inter prediction apparatus may include a construction unit configured to construct a merge candidate list based on motion information of a coded picture block, where the motion information defines an MVP candidate in the merge candidate list, and add new motion information as a new MVP candidate to the merge candidate list when a quantity of MVP candidates in the merge candidate list is less than a maximum candidate quantity. The inter prediction apparatus may further include a prediction block determining unit configured to obtain a merge index of a position of optimum motion information in the merge candidate list, obtain the optimum motion information based on the merge index, and determine a predicted current picture block based on the optimum motion information.

In some embodiments, the image prediction apparatus is, for example, applied to a video encoding apparatus (e.g., a video encoder) or a video decoding apparatus (e.g., a video decoder).

The method according to the first aspect of the disclosure can be performed by the apparatus according to the fifth aspect of the application. Further features and embodiments of the apparatus according to the fifth aspect of the application correspond to the features and embodiments of the apparatus according to the first aspect of the application.

According to a sixth aspect, an inter prediction apparatus is described. The inter prediction apparatus includes functional units for implementing any one of the methods in the fourth aspect. For example, the inter prediction apparatus may include: a construction unit, configured to: construct a merge candidate list of a current picture block; add HMVP candidate motion information to the merge candidate list, in a case that a quantity of candidate motion information in the merge candidate list is less than a maximum candidate quantity of the merge candidate list minus N, wherein N is a positive integer; a prediction unit, configured to: obtain a merge index of the current picture block; obtain motion information of the current picture block based on the merge candidate list and the merge index; and determine a predicted block of the current picture block based on the motion information of the current picture block.

In an embodiment, the construction unit is further configured to: add pairwise average candidate motion information to the merge candidate list, in a case that a quantity of candidate motion information in the merge candidate list is equal to a maximum candidate quantity of the merge candidate list minus N.

In an embodiment, the pairwise average candidate motion information are generated by averaging a predefined pair of MVP candidates in the merge candidate list.

In an embodiment, the prediction unit is configured to: obtain motion information from the merge candidate list by using the merge index.

In an embodiment, the prediction unit is configured to: determine the motion information from the merge candidate list using a rate-distortion cost.

In some embodiments, the image prediction apparatus is, for example, applied to a video encoding apparatus (e.g., a video encoder) or a video decoding apparatus (e.g., a video decoder).

In an embodiment, the method according to the fourth aspect can be performed by the apparatus according to the sixth aspect. Further features and embodiments of the apparatus according to the sixth aspect of the application correspond to the features and embodiments of the apparatus according to the fourth aspect of the application.

According to a seventh aspect, an image prediction apparatus is described. The apparatus includes a processor and a memory coupled to the processor, and the processor is configured to perform the method in any one of the first aspect to fourth aspect or the embodiments of the first aspect to fourth aspect.

According to an eighth aspect, a video decoding device is described. The video decoding device includes a non-volatile storage medium and a processor, the non-volatile storage medium stores an executable program, and the processor and the non-volatile storage medium are coupled to each other, and the processor executes the executable program to implement the method in any one of the first aspect to fourth aspect or the embodiments of the first aspect to fourth aspect.

According to a ninth aspect, a computer-readable storage medium is described. The computer-readable storage medium stores programming instructions, and when the instructions run on a computer, the computer is enabled to perform the method in any one of the first aspect to fourth aspect or the embodiments of the first aspect to fourth aspect.

According to a tenth aspect, a computer program product including programming instructions is described. When the computer program product runs on a computer, the computer is enabled to perform the method in any one of the first aspect to fourth aspect or the embodiments of the first aspect to fourth aspect.

According to an eleventh aspect, an embodiment of this application provides a computer program comprising program code for performing the method according to the first aspect to fourth aspect or any embodiment of the first aspect to fourth aspect when executed on a computer.

According to a twelfth aspect, a computer-implemented method for inter prediction in video coding is described. In one embodiment, the method constructs a merge candidate list based on motion information of a coded picture block. The motion information defines a motion vector predictor (MVP) candidate in the merge candidate list. When a quantity of MVP candidates in the merge candidate list is less than a first maximum candidate quantity, the method adds history-based motion vector predictor (HMVP) candidate motion information to the merge candidate list to obtain a first merge candidate list. When a quantity of MVP candidates in the first merge candidate list is less than a second maximum candidate quantity, the method adds new HMVP candidate motion information to the first merge candidate list to obtain a new merge candidate list. The method obtains a merge index of a position of optimum motion information in the new merge candidate list. The method obtains the optimum motion information based on the merge index. The method determines a predicted current picture block based on the optimum motion information.

It should be understood that beneficial effects obtained by various aspects and corresponding embodiments are similar, and are not repeated.

BRIEF DESCRIPTION OF DRAWINGS

To describe technical solutions in embodiments of the present disclosure or in the background more clearly, the following describes accompanying drawings required for describing the embodiments of the present disclosure or the background.

DETAILED DESCRIPTION

Figure 1A:
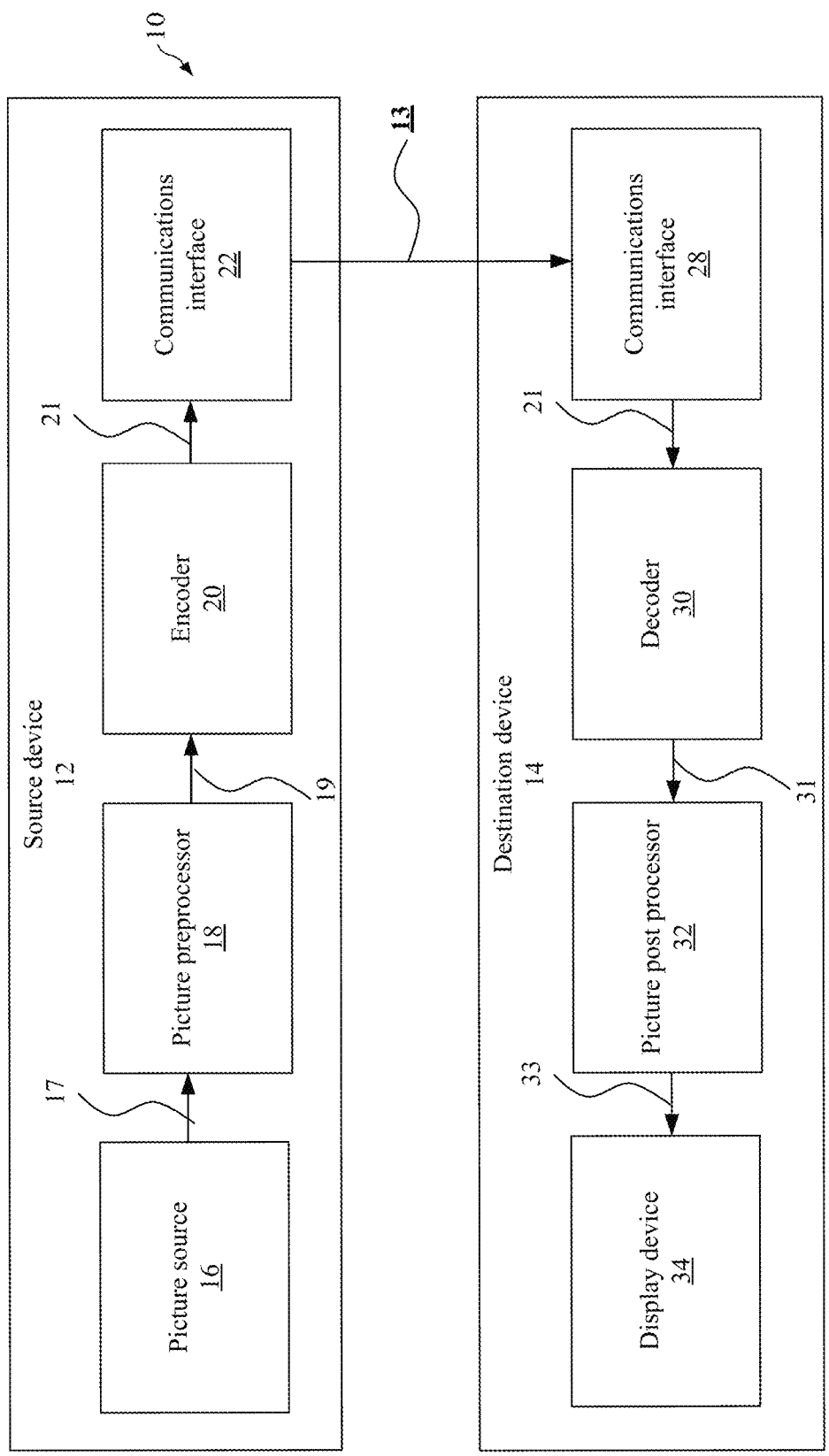
FIG. 1A is a block diagram of an example of a video encoding and decoding system according to one embodiment.

The following describes embodiments of the present disclosure with reference to accompanying drawings in the embodiments of the present disclosure. In the following descriptions, reference is made to the accompanying drawings that form a part of this disclosure and that show, by way of illustration, specific aspects of the embodiments of the present disclosure or specific aspects in which the embodiments of the present disclosure may be used. It should be understood that the embodiments of the present disclosure may be used in other aspects, and may include structural or logical changes not depicted in the accompanying drawings. Therefore, the following detailed descriptions shall not be construed as limitation, and the scope of the present disclosure is defined by the appended claims. For example, it should be understood that disclosed content with reference to a described method may also hold true for a corresponding device or system configured to perform the method, and vice versa. For example, if one or more specific method operations are described, a corresponding device may include one or more units such as functional units for performing the described one or more method operations (for example, one unit performing the one or more operations; or a plurality of units, each of which performs one or more of the plurality of operations), even if such one or more units are not explicitly described or illustrated in the accompanying drawings. Correspondingly, for example, if a specific apparatus is described based on one or more units such as functional units, a corresponding method may include one or more operations for performing a functionality of the one or more units (for example, one operation performing the functionality of the one or more units; or a plurality of operations, each of which performs a functionality of one or more of the plurality of units), even if such one or more operations are not explicitly described or illustrated in the accompanying drawings. Further, it should be understood that features of the various example embodiments and/or aspects described herein may be combined with each other, unless specifically noted otherwise.

The technical solutions in the embodiments of the present disclosure may not only be applied to existing video coding standards (such as the H.264 standard and the HEVC standard), but also be applied to future video coding standards (such as the H.266 standard). Terms used in the implementation part of the present disclosure are merely intended to explain specific embodiments of the present disclosure, but are not intended to limit the present disclosure. In the following, some concepts that may be used in the embodiments of the present disclosure are first described briefly.

Video coding generally refers to processing a sequence of pictures that form a video or a video sequence. In the field of video coding, the terms "picture", "frame", or "image" can be used as synonyms. Video coding used herein indicates video encoding or video decoding. Video encoding is performed at a source side, and generally includes processing (for example, through compression) original video pictures to reduce an amount of data required for representing the video pictures, for more efficient storage and/or transmission. Video decoding is performed at a destination side, and generally includes inverse processing relative to an encoder to reconstruct video pictures. Video picture "coding" in the embodiments can be understood as "encoding" or "decoding" for a video sequence. A combination of an encoding part and a decoding part is also referred to as codec (encoding and decoding).

A video sequence includes a series of images (or pictures). The image is further partitioned into slices, and each slice is further partitioned into blocks. In video coding, coding processing is performed per block. In some new video coding standards, a concept of block is further extended. For example, in the H.264 standard, there is a macroblock (MB), and the macroblock may be further partitioned into a plurality of prediction blocks (or partitions) that can be used for predictive coding. In the high efficiency video coding (HEVC) standard, basic concepts such as a coding unit (CU), a prediction unit (PU), and a transform unit (TU) are used, so that a plurality of types of block units are obtained through functional division, and the units are described with reference to a new tree-based structure. For example, a CU may be partitioned into smaller CUs based on a quadtree, and each smaller CU may continue to be partitioned, thereby forming a quadtree structure. The CU is a basic unit for partitioning and coding a coded image. The PU and the TU also have a similar tree structure, and the PU may correspond to a prediction block and is a basic unit of predictive coding. The CU is further partitioned into a plurality of PUs according to a partitioning mode. The TU may correspond to a transform block, and is a basic unit for transforming a prediction residual. Essentially, all of the CU, the PU, and the TU are concepts of blocks (or picture blocks).

For example, in HEVC, a coding tree unit (CTU) is split into a plurality of CUs by using a quadtree structure denoted as a coding tree. A decision on whether to code a picture area by using inter-picture (temporal) or intra-picture (spatial) prediction is made at a CU level. Each CU may be further split into one, two, or four PUs based on a PU splitting type. Inside one PU, a same prediction process is applied, and related information is transmitted to a decoder on a PU basis. After obtaining a residual block by applying the prediction process based on the PU splitting type, the CU may be partitioned into TUs based on another quadtree structure similar to the coding tree used for the CU. In the latest development of the video compression technologies, a quadtree and binary tree (QTBT) partitioning frame is used to partition a coding block. In a QTBT block structure, a CU may have a square or rectangular shape.

Herein, for ease of description and understanding, a picture block to be coded in a current coded image may be referred to as a current block. For example, in encoding, the current block is a block currently being encoded, and in decoding, the current block is a block currently being decoded. A decoded picture block, in a reference picture, used for predicting the current block is referred to as a reference block. In other words, the reference block is a block that provides a reference signal for the current block, where the reference signal represents a pixel value within the picture block. A block that is in the reference picture and that provides a prediction signal for the current block may be referred to a prediction block, where the prediction signal represents a pixel value, a sample value, or a sampling signal within the prediction block. For example, after a plurality of reference blocks are traversed, an optimal reference block is found, the optimal reference block provides a prediction for the current block, and this block is referred to as a prediction block.

In a case of lossless video coding, original video pictures can be reconstructed, which means reconstructed video pictures have same quality as the original video pictures (assuming that no transmission loss or other data loss occurs during storage or transmission). In a case of lossy video coding, further compression is performed through, for example, quantization, to reduce an amount of data required for representing video pictures, and the video pictures cannot be completely reconstructed at a decoder side, which means quality of reconstructed video pictures is lower or worse than that of the original video pictures.

Several video coding standards since H.261 belong to "lossy hybrid video codecs" (that is, spatial and temporal prediction in a sample domain is combined with 2D transform coding for applying quantization in a transform domain). Each picture of a video sequence is usually partitioned into a set of non-overlapping blocks, and coding is usually performed at a block level. In other words, at an encoder side, a video is usually processed, that is, encoded, at a block (or video block) level. For example, to generate a prediction block through spatial (intra-picture) prediction and temporal (inter-picture) prediction, the prediction block is subtracted from a current block (block currently processed or to be processed) to obtain a residual block, and the residual block is transformed and quantized in the transform domain to reduce an amount of data that is to be transmitted (compressed), whereas at a decoder side, a part of inverse processing relative to the encoder is applied to the encoded or compressed block to reconstruct the current block for representation. Furthermore, the encoder duplicates a decoder processing loop, so that the encoder and the decoder generate same predictions (for example, intra predictions and inter predictions) and/or reconstruction, for processing, that is, for coding subsequent blocks.

The following describes a system architecture applied in the embodiments of the present disclosure. FIG. 1A is a schematic block diagram of an example of a video encoding and decoding system according to one embodiment. As shown in FIG. 1A, video encoding and decoding system 10 may include a source device 12 and a destination device 14. The source device 12 generates encoded video data, and therefore the source device 12 may be referred to as a video encoding apparatus. The destination device 14 may decode the encoded video data generated by the source device 12, and therefore the destination device 14 may be referred to as a video decoding apparatus. Embodiments of the source device 12, the destination device 14, or both the source device 12 and the destination device 14 may include one or more processors and a memory coupled to the processor(s). The memory may include but is not limited to a random access memory (RAM), a read-only memory (ROM), an electrically erasable programmable read-only memory (EEPROM), a flash memory, or any other medium that can be used to store desired program code in a form of programming instructions or a data structure accessible by a computer, as described herein. The source device 12 and the destination device 14 may include various apparatuses, including a desktop computer, a mobile computing apparatus, a notebook computer (e.g., a laptop), a tablet computer, a set-top box, a telephone handset such as a so-called "smart" phone, a television, a camera, a display apparatus, a digital media player, a video game console, an in-vehicle computer, a wireless communications device, or the like.

Although FIG. 1A depicts the source device 12 and the destination device 14 as separate devices, an embodiment may alternatively include both the source device 12 and the destination device 14 or functionalities of both the source device 12 and the destination device 14, that is, the source device 12 or a corresponding functionality and the destination device 14 or a corresponding functionality. In such embodiments, the source device 12 or the corresponding functionality and the destination device 14 or the corresponding functionality may be implemented by using same hardware and/or software, separate hardware and/or software, or any combination thereof.

A communication connection may be performed between the source device 12 and the destination device 14 through a link 13, and the destination device 14 may receive encoded video data from the source device 12 through the link 13. The link 13 may include one or more media or apparatuses capable of moving the encoded video data from the source device 12 to the destination device 14. In one example, the link 13 may include one or more communication media that enable the source device 12 to transmit the encoded video data directly to the destination device 14 in real time. In this example, the source device 12 may modulate the encoded video data according to a communications standard (for example, a wireless communication protocol), and may transmit modulated video data to the destination device 14. The one or more communication media may include a wireless communication medium and/or a wired communication medium, for example, a radio frequency (RF) spectrum or one or more physical transmission lines. The one or more communication media may form a part of a packet-based network, and the packet-based network is, for example, a local area network, a wide area network, or a global network (for example, the Internet). The one or more communication media may include a router, a switch, a base station, or another device that facilitates communication from the source device 12 to the destination device 14.

The source device 12 includes an encoder 20, and in one embodiment, the source device 12 may further include a picture source 16, a picture preprocessor 18, and a communications interface 22. In one embodiment, the encoder 20, the picture source 16, the picture preprocessor 18, and the communications interface 22 may be hardware components in the source device 12, or may be software programs in the source device 12. Separate descriptions are as follows:

The picture source 16 may include or be any type of picture capturing device configured to, for example, capture a real-world picture, and/or any type of device for generating a picture or comment (for screen content encoding, some text on a screen is also considered as a part of a to-be-encoded picture or image), for example, a computer graphics processor configured to generate a computer animation picture, or any type of device configured to obtain and/or provide a real-world picture or a computer animation picture (for example, screen content or a virtual reality (VR) picture), and/or any combination thereof (for example, an augmented reality (AR) picture). The picture source 16 may be a camera configured to capture a picture or a memory configured to store a picture. The picture source 16 may further include any type of (internal or external) interface for storing a previously captured or generated picture and/or for obtaining or receiving a picture. When the picture source 16 is a camera, the picture source 16 may be, for example, a local camera or an integrated camera integrated into the source device. When the picture source 16 is a memory, the picture source 16 may be a local memory or, for example, an integrated memory integrated into the source device. When the picture source 16 includes an interface, the interface may be, for example, an external interface for receiving a picture from an external video source. The external video source is, for example, an external picture capturing device such as a camera, an external memory, or an external picture generating device. The external picture generating device is, for example, an external computer graphics processor, a computer, or a server. The interface may be any type of interface, for example, a wired or wireless interface or an optical interface, according to any proprietary or standardized interface protocol.

A picture may be regarded as a two-dimensional array or matrix of pixel (picture element). The pixel in the array may also be referred to as a sample. A quantity of samples in horizontal and vertical directions (or axes) of the array or the picture defines a size and/or resolution of the picture. For representation of color, three color components are usually used. The picture may be represented as or include three sample arrays. For example, in an RBG format or a color space, a picture includes corresponding red, green, and blue sample arrays. However, in video coding, each pixel is usually represented in a luminance/chrominance format or a color space, for example, a picture in a YUV format includes a luminance component indicated by Y (sometimes indicated by L alternatively) and two chrominance components indicated by U and V. The luminance (luma) component Y represents brightness or gray level intensity (for example, both are the same in a gray-scale picture), and the two chrominance (chroma) components U and V represent chromaticity or color information components. Correspondingly, the picture in the YUV format includes a luminance sample array of luminance sample values (Y) and two chrominance sample arrays of chrominance values (U and V). Pictures in the RGB format may be transformed or converted to the YUV format and vice versa. This process is also referred to as color conversion or transformation. If a picture is monochrome, the picture may include only a luminance sample array. In one embodiment, a picture transmitted by the picture source 16 to the picture processor may also be referred to as raw picture data 17.

The picture preprocessor 18 is configured to receive the raw picture data 17 and perform preprocessing on the raw picture data 17 to obtain a preprocessed picture 19 or preprocessed picture data 19. For example, the preprocessing performed by the picture preprocessor 18 may include trimming, color format conversion (for example, from the RGB format to the YUV format), color correction, or denoising.

The encoder 20 (also referred to as video encoder 20) is configured to receive the preprocessed picture data 19, and process the preprocessed picture data 19 by using a related prediction mode (such as a prediction mode in each embodiment of this disclosure), to provide encoded picture data 21 (structural details of the encoder 20 are further described herein below based on FIG. 2, FIG. 4, or FIG. 5). In some embodiments, the encoder 20 may be configured to perform various embodiments described herein below to implement encoder-side application of a chroma block prediction method described in the present disclosure.

The communications interface 22 may be configured to receive the encoded picture data 21, and transmit the encoded picture data 21 to the destination device 14 or any other device (for example, a memory) through the link 13 for storage or direct reconstruction. The other device may be any device used for decoding or storage. The communications interface 22 may be, for example, configured to encapsulate the encoded picture data 21 into an appropriate format, for example, a data packet, for transmission over the link 13.

The destination device 14 includes a decoder 30, and in one embodiment, the destination device 14 may further include a communications interface 28, a picture post processor 32, and a display device 34. Separate descriptions are as follows:

The communications interface 28 may be configured to receive the encoded picture data 21 from the source device 12 or any other source. The any other source is, for example, a storage device, and the storage device is, for example, an encoded picture data storage device. The communications interface 28 may be configured to transmit or receive the encoded picture data 21 through the link 13 between the source device 12 and the destination device 14 or through any type of network. The link 13 is, for example, a direct wired or wireless connection, and the any type of network is, for example, a wired or wireless network or any combination thereof, or any type of private or public network, or any combination thereof. The communications interface 28 may be, for example, configured to decapsulate the data packet transmitted through the communications interface 22, to obtain the encoded picture data 21.

Both the communications interface 28 and the communications interface 22 may be configured as unidirectional communications interfaces or bidirectional communications interfaces, and may be configured to, for example, send and receive messages to set up a connection, and acknowledge and exchange any other information related to a communication link and/or data transmission such as encoded picture data transmission.

The decoder 30 (also referred to as video decoder 30) is configured to receive the encoded picture data 21 and provide decoded picture data 31 or a decoded picture 31 (structural details of the decoder 30 are further described herein below based on FIG. 3, FIG. 4, or FIG. 5). In some embodiments, the decoder 30 may be configured to perform various embodiments described herein below to implement decoder-side application of a chroma block prediction method described in the present disclosure.

The picture post processor 32 is configured to post-process the decoded picture data 31 (also referred to as reconstructed picture data) to obtain post-processed picture data 33. The post-processing performed by the picture post processor 32 may include color format conversion (for example, from a YUV forma to an RGB format), color correction, trimming, re-sampling, or any other processing. The picture post processor 32 may be further configured to transmit the post-processed picture data 33 to the display device 34.

The display device 34 is configured to receive the post-processed picture data 33 to display a picture, for example, to a user or a viewer. The display device 34 may be or include any type of display configured to present a reconstructed picture, for example, an integrated or external display or monitor. For example, the display may include a liquid crystal display (LCD), an organic light emitting diode (OLED) display, a plasma display, a projector, a micro LED display, a liquid crystal on silicon (LCoS), a digital light processor (DLP), or any type of other displays.

Although FIG. 1A depicts the source device 12 and the destination device 14 as separate devices, an embodiment may alternatively include both the source device 12 and the destination device 14 or functionalities of both the source device 12 and the destination device 14, that is, the source device 12 or a corresponding functionality and the destination device 14 or a corresponding functionality. In such embodiments, the source device 12 or the corresponding functionality and the destination device 14 or the corresponding functionality may be implemented by using same hardware and/or software, separate hardware and/or software, or any combination thereof.

As will be apparent for a person skilled in the art based on the descriptions, existence and (exact) division of functionalities of the different units or functionalities of the source device 12 and/or the destination device 14 shown in FIG. 1A may vary with an actual device and application. The source device 12 and the destination device 14 may include any of a wide range of devices, including any type of handheld or stationary device, for example, a notebook or laptop computer, a mobile phone, a smartphone, a tablet or tablet computer, a camera, a desktop computer, a set-top box, a television, a camera, an in-vehicle device, a display device, a digital media player, a video game console, a video streaming device (such as a content service server or a content delivery server), a broadcast receiver device, or a broadcast transmitter device, and may not use or may use any type of operating system.

The encoder 20 and the decoder 30 each may be implemented as any of various suitable circuits, for example, one or more microprocessors, digital signal processors (DSP), application-specific integrated circuits (ASIC), field-programmable gate arrays (FPGA), discreet logic, hardware, or any combinations thereof. If the techniques are implemented partially in software, a device may store a software instruction in a suitable and non-transitory computer readable storage medium and may execute the instruction in hardware by using one or more processors, to perform the techniques of this disclosure. Any of the foregoing (including hardware, software, a combination of hardware and software, and the like) may be considered as one or more processors.

In some cases, the video encoding and decoding system 10 shown in FIG. 1A is merely an example and the techniques of this disclosure may be applied to video coding settings (for example, video encoding or video decoding) that do not necessarily include any data communication between an encoding device and a decoding device. In other examples, data may be retrieved from a local memory, streamed over a network, or the like. A video encoding device may encode the data and store the data into a memory, and/or a video decoding device may retrieve the data from the memory and decode the data. In some examples, the encoding and decoding are performed by devices that do not communicate with each other but simply encode data into a memory and/or retrieve the data from the memory and decode the data.

Figure 1B:
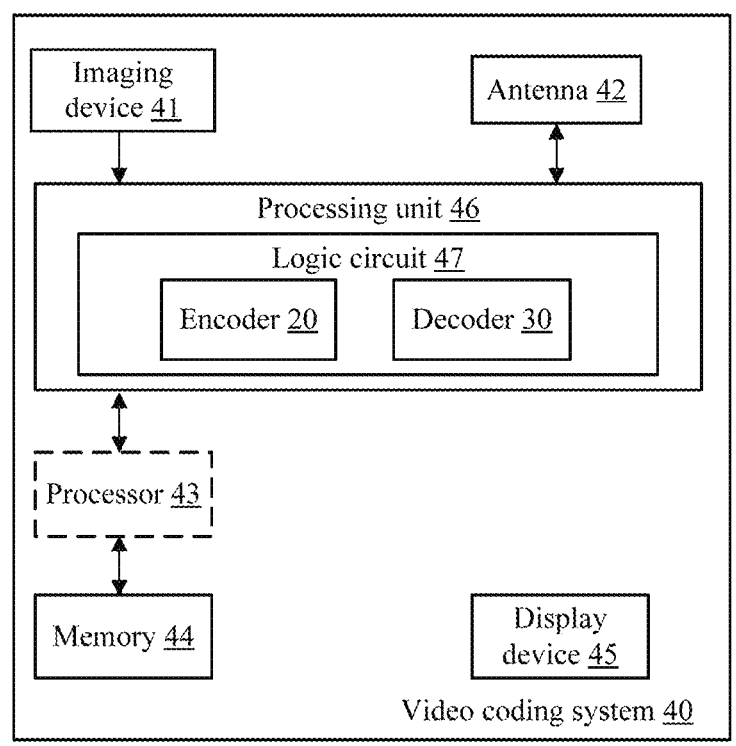
FIG. 1B is a block diagram of an example of a video coding system according to one embodiment.

FIG. 1B is an illustrative diagram of an example of a video coding system according to one embodiment. Referring to FIG. 1B, video coding system 40 includes encoder 20 of FIG. 2 and/or the decoder 30 of FIG. 3 according to one embodiment. The video coding system 40 can implement a combination of various techniques in the embodiments of the present disclosure. In FIG. 1B, the video coding system 40 may include an imaging device 41, the encoder 20, the decoder 30 (and/or a video encoder/decoder implemented by a logic circuit 47 of a processing unit 46), an antenna 42, one or more processors 43, one or more memories 44, and/or a display device 45.

As shown in FIG. 1B, the imaging device 41, the antenna 42, the processing unit 46, the logic circuit 47, the encoder 20, the decoder 30, the processor 43, the memory 44, and/or the display device 45 can communicate with each other. As described, although the video coding system 40 is illustrated with the encoder 20 and the decoder 30, the video coding system 40 may include only the encoder 20 or only the decoder 30 in different examples.

In some embodiments, the antenna 42 may be configured to transmit or receive an encoded bitstream of video data. Further, in some embodiments, the display device 45 may be configured to present the video data. In some examples, the logic circuit 47 may be implemented by the processing unit 46. The processing unit 46 may include an ASIC logic, a graphics processor, a general purpose processor, or the like. The video coding system 40 may also include the processor 43 (which may be optional in some embodiments). The processor 43 may similarly include an ASIC logic, a graphics processor, a general purpose processor, or the like. In some embodiments, the logic circuit 47 may be implemented by hardware, for example, video coding dedicated hardware, and processor 43 may be implemented by general purpose software, an operating system, or the like. In addition, the memory 44 may be any type of memory, for example, a volatile memory (for example, a static random access memory (SRAM) or a dynamic random access memory (DRAM)) or a nonvolatile memory (for example, a flash memory). In a non-limiting example, the memory 44 may be implemented by a cache memory. In some embodiments, the logic circuit 47 may access the memory 44 (for example, for implementation of an image buffer). In other embodiments, the logic circuit 47 and/or the processing unit 46 may include a memory (for example, a cache) for implementation of an image buffer or the like.

In some embodiments, the encoder 20 implemented by the logic circuit may include an image buffer (for example, implemented by the processing unit 46 or the memory 44) and a graphics processing unit (for example, implemented by the processing unit 46). The graphics processing unit may be communicatively coupled to the image buffer. The graphics processing unit may include the encoder 20 implemented by the logic circuit 47, to implement various modules that are described with reference to FIG. 2 and/or any other encoder system or subsystem described herein. The logic circuit may be configured to perform various operations described herein.

In some embodiments, the decoder 30 may be implemented by the logic circuit 47 in a similar manner to implement various modules that are described with reference to the decoder 30 in FIG. 3 and/or any other decoder system or subsystem described herein. In some embodiments, the decoder 30 implemented by the logic circuit may include an image buffer (for example, implemented by the processing unit 2820 or the memory 44) and a graphics processing unit (for example, implemented by the processing unit 46). The graphics processing unit may be communicatively coupled to the image buffer. The graphics processing unit may include the decoder 30 implemented by the logic circuit 47, to implement various modules that are described with reference to FIG. 3 and/or any other decoder system or subsystem described herein.

In some embodiments, the antenna 42 may be configured to receive an encoded bitstream of video data. As described, the encoded bitstream may include data, an indicator, an index value, mode selection data, or the like that is related to video frame encoding and that is described herein, for example, data related to coding partitioning (for example, a transform coefficient or a quantized transform coefficient, an optional indicator (as described), and/or data defining the coding partitioning). The video coding system 40 may further include the decoder 30 that is coupled to the antenna 42 and that is configured to decode the encoded bitstream. The display device 45 is configured to present a video frame.

It should be understood that in this embodiment of the present disclosure, for the example described with regard to the encoder 20, the decoder 30 may be configured to perform a reverse process. With regard to signaling syntax elements, the decoder 30 may be configured to receive and parse such syntax elements and correspondingly decode related video data. In some embodiments, the encoder 20 may entropy encode the syntax elements into an encoded video bitstream. In such examples, the decoder 30 may parse such syntax elements and correspondingly decode related video data.

It should be noted that the method described in this embodiment of the present disclosure is mainly used for an inter prediction process, and the process exists in both the encoder 20 and the decoder 30. The encoder 20 and the decoder 30 in this embodiment of the present disclosure may be an encoder and a decoder corresponding to a video standard protocol such as H.263, H.264, HEVV, MPEG-2, MPEG-4, VP8, and VP9 or a next generation video standard protocol (such as H.266).

Figure 2:
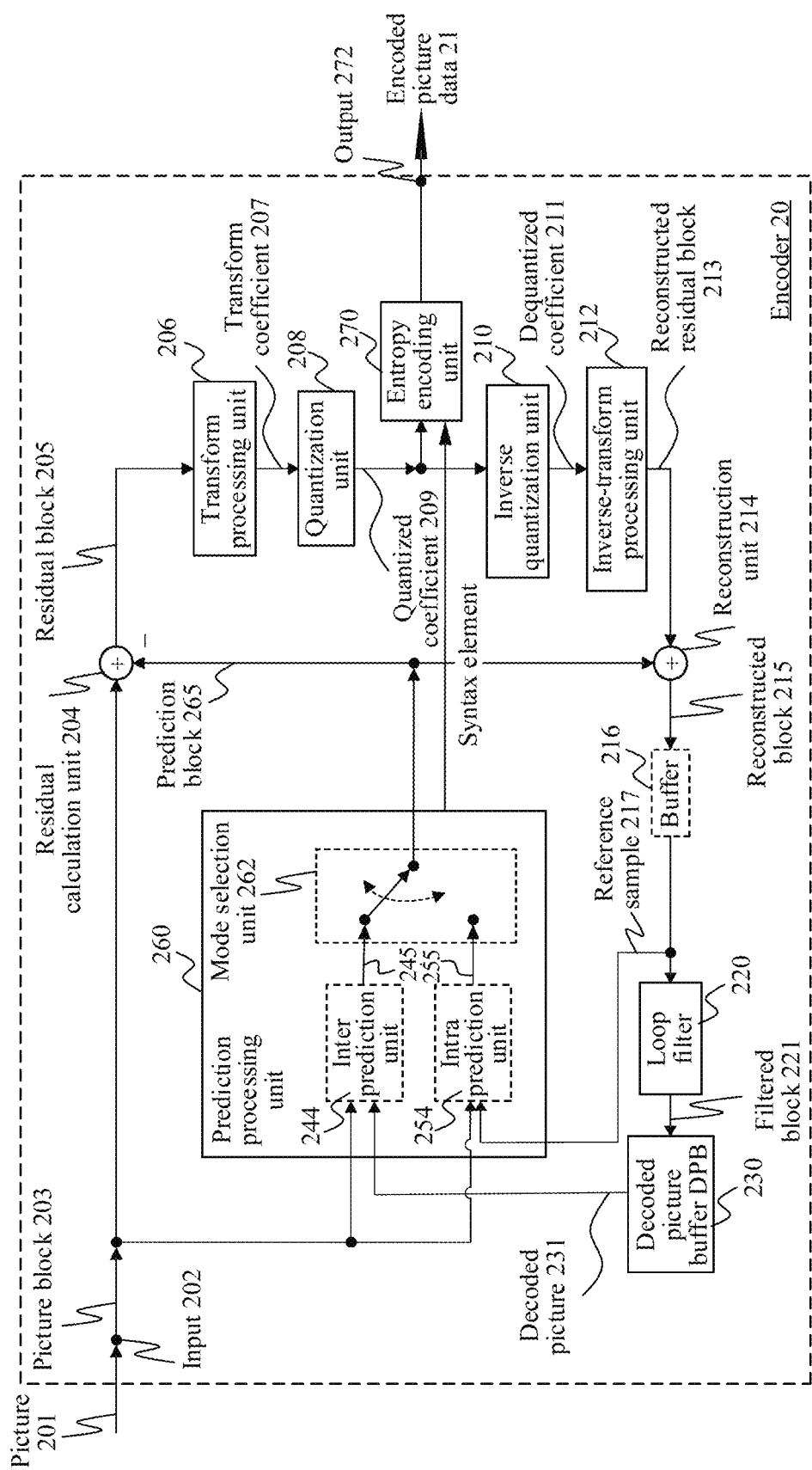
FIG. 2 is a block diagram of an example structure of an encoder according to one embodiment.

FIG. 2 is a schematic/conceptual block diagram of an example of an encoder according to one embodiment. In FIG. 2, encoder 20 includes a residual calculation unit 204, a transform processing unit 206, a quantization unit 208, an inverse-quantization unit 210, an inverse-transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown in the diagram). The encoder 20 shown in FIG. 2 may also be referred to as a hybrid video encoder or a video encoder according to a hybrid video codec.

Figure 3:
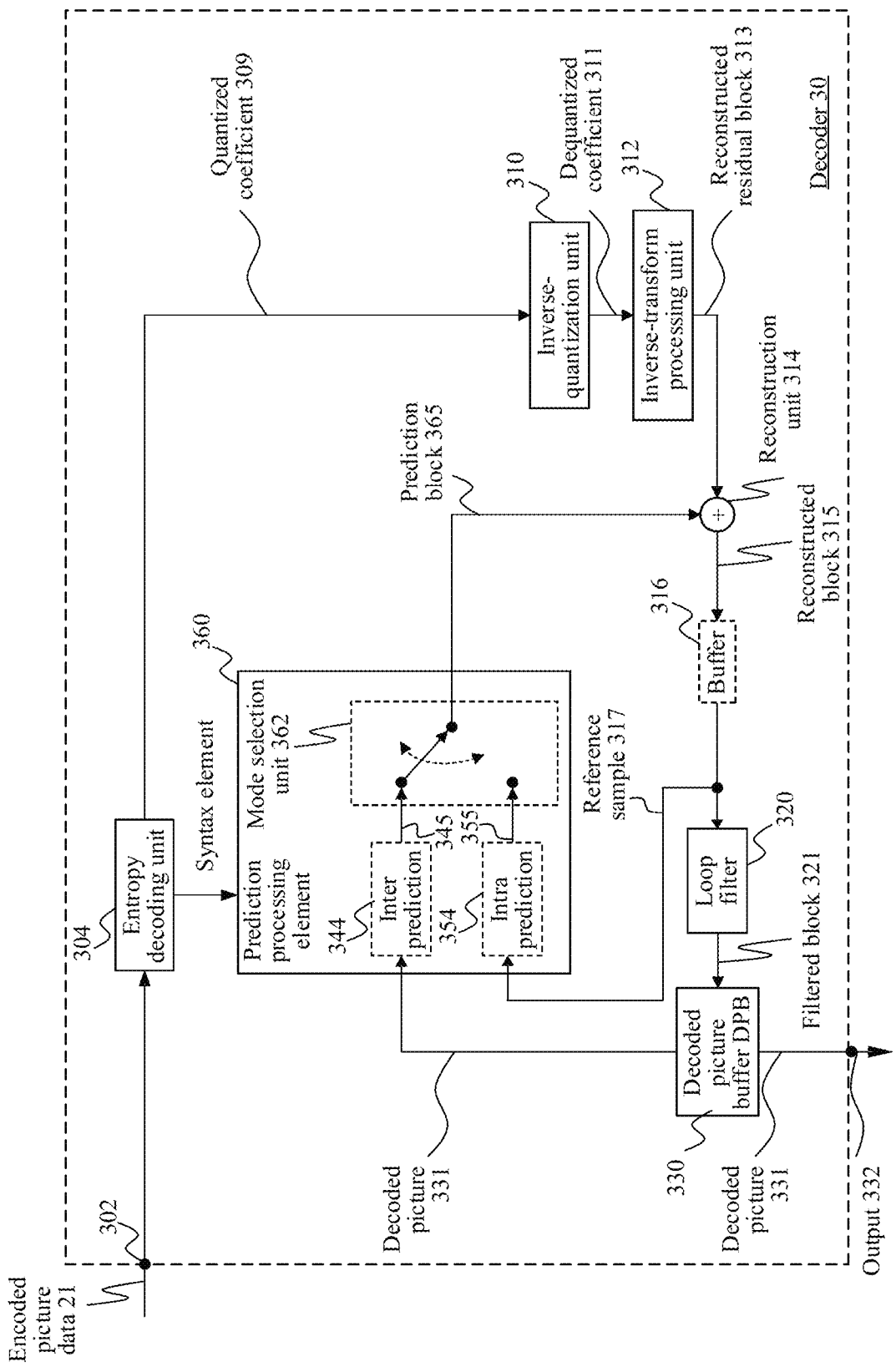
FIG. 3 is a block diagram of an example structure of a decoder according to one embodiment.

For example, the residual calculation unit 204, the transform processing unit 206, the quantization unit 208, the prediction processing unit 260, and the entropy encoding unit 270 form a forward signal path of the encoder 20, whereas, for example, the inverse-quantization unit 210, the inverse-transform processing unit 212, the reconstruction unit 214, the buffer 216, the loop filter 220, the DPB 230, and the prediction processing unit 260 form a reverse signal path of the encoder, where the reverse signal path of the encoder corresponds to a signal path of a decoder (e.g., decoder 30 of FIG. 3).

The encoder 20 receives, for example, by using an input 202, a picture 201 or a picture block 203 of the picture 201, for example, a picture in a sequence of pictures forming a video or a video sequence. The picture block 203 may also be referred to as a current picture block or a to-be-encoded picture block, and the picture 201 may be referred to as a current picture or a to-be-encoded picture (particularly in video coding to distinguish the current picture from other pictures, the other pictures are, for example, previously encoded and/or decoded pictures in a same video sequence, that is, the video sequence that also includes the current picture).

In one embodiment, encoder 20 may include a partitioning unit (not depicted in FIG. 2) configured to partition the picture 201 into a plurality of blocks such as the picture block 203. The picture 201 is generally partitioned into a plurality of non-overlapping blocks. The partitioning unit may be configured to use a same block size for all pictures in a video sequence and a corresponding grid defining the block size, or change a block size between pictures or subsets or picture groups and partition each picture into corresponding blocks.

In one embodiment, the prediction processing unit 260 of the encoder 20 may be configured to perform any combination of the partitioning techniques described above.

Like the picture 201, the picture block 203 is also or may be considered as a two-dimensional array or matrix of samples with sample values, although of a smaller size than the picture 201. In other words, the picture block 203 may include, for example, one sample array (for example, a luma array in a case of a monochrome picture 201), three sample arrays (for example, one luma array and two chroma arrays in a case of a color picture), or any other quantity and/or type of arrays depending on an applied color format. A quantity of samples in horizontal and vertical directions (or axes) of the picture block 203 defines a size of the picture block 203.

The encoder 20 shown in FIG. 2 is configured to encode the picture 201 block by block, for example, perform encoding and prediction on each picture block 203.

The residual calculation unit 204 is configured to calculate a residual block 205 based on the picture block 203 and a prediction block 265 (further details about the prediction block 265 are provided herein below), for example, obtain the residual block 205 in a sample domain by subtracting sample values of the prediction block 265 from sample values of the picture block 203 sample by sample (pixel by pixel).

The transform processing unit 206 is configured to apply a transform, for example, a discrete cosine transform (DCT) or a discrete sine transform (DST), to sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as transforms specified for HEVC/H.265. Compared with an orthogonal DCT transform, such integer approximations are usually scaled by a factor. To preserve a norm of a residual block processed through forward and inverse transforms, an additional scaling factor is applied as a part of a transform process. The scaling factor is usually chosen based on some constraints, for example, the scaling factor is a power of two for a shift operation, a bit depth of the transform coefficient, or a tradeoff between accuracy and implementation costs. For example, a specific scaling factor is specified for the inverse transform at a side of the decoder 30 by, for example, an inverse-transform processing unit 212 (and a corresponding inverse transform at a side of the encoder 20 by, for example, the inverse-transform processing unit 212), and correspondingly, a corresponding scaling factor may be specified for the forward transform at the side of the encoder 20 by the transform processing unit 206.

The quantization unit 208 is configured to quantize the transform coefficients 207 to obtain quantized transform coefficients 209, for example, by applying scalar quantization or vector quantization. The quantized transform coefficients 209 may also be referred to as quantized residual coefficients 209. A quantization process may reduce a bit depth related to some or all of the transform coefficients 207. For example, an n-bit transform coefficient may be rounded down to an m-bit transform coefficient during quantization, where n is greater than m. A quantization degree may be modified by adjusting a quantization parameter (QP). For example, for scalar quantization, different scaling may be applied to achieve finer or coarser quantization. A smaller quantization operation corresponds to finer quantization, whereas a larger quantization operation corresponds to coarser quantization. An appropriate quantization operation may be indicated by a QP. For example, the quantization parameter may be an index to a predefined set of appropriate quantization operations. For example, a smaller quantization parameter may correspond to finer quantization (e.g., a smaller quantization operation) and a larger quantization parameter may correspond to coarser quantization (e.g., a larger quantization operation), and vice versa. The quantization may include division by a quantization operation and corresponding quantization or dequantization, for example, by the inverse quantization 210, or may include multiplication by a quantization operation. Embodiments according to some standards such as HEVC may use a quantization parameter to determine the quantization operation. Generally, the quantization operation may be calculated based on a quantization parameter by using a fixed point approximation of an equation including division. Additional scaling factors may be introduced for quantization and dequantization, to restore the norm of the residual block, which may be modified because of scaling used in the fixed point approximation of the equation for the quantization operation and the quantization parameter. In one example embodiment, a scale of the inverse transform may be combined with a scale of dequantization. Alternatively, customized quantization tables may be used and signaled from an encoder to a decoder, for example, in a bitstream. The quantization is a lossy operation, where a larger quantization operation indicates a larger loss.

The inverse-quantization unit 210 is configured to apply the inverse quantization of the quantization unit 208 to quantized coefficients to obtain dequantized coefficients 211, for example, apply, based on or by using a same quantization operation as the quantization unit 208, the inverse of a quantization scheme applied by the quantization unit 208. The dequantized coefficients 211 may also be referred to as dequantized residual coefficients 211, and correspond, although usually different from the transform coefficients due to a loss caused by quantization, to the transform coefficients 207.

The inverse-transform processing unit 212 is configured to apply an inverse transform of the transform applied by the transform processing unit 206, for example, an inverse DCT or an inverse DST, to obtain an inverse transform block 213 in the sample domain. The inverse transform block 213 may also be referred to as an inverse transform dequantized block 213 or an inverse transform residual block 213.

The reconstruction unit 214 (for example, a summer 214) is configured to add the inverse transform block 213 (that is, the reconstructed residual block 213) to the prediction block 265 to obtain a reconstructed block 215 in the sample domain, for example, by adding sample values of the reconstructed residual block 213 and the sample values of the prediction block 265.

In one embodiment, a buffer unit (or buffer) 216 of, for example, a line buffer 216, is configured to buffer or store the reconstructed block 215 and corresponding sample values, for example, for intra prediction. In other embodiments, the encoder may be configured to use unfiltered reconstructed blocks and/or the corresponding sample values stored in the buffer unit 216 for any type of estimation and/or prediction, for example, intra prediction.

For example, one embodiment of the encoder 20 may be configured so that the buffer unit 216 is not only used for storing the reconstructed block 215 for intra prediction 254 but also used for the loop filter unit 220 (not shown in FIG. 2), and/or so that, for example, the buffer unit 216 and the decoded picture buffer unit 230 form one buffer. Other embodiments may be configured to use filtered blocks 221 and/or blocks or samples from the decoded picture buffer 230 (the blocks or samples are not shown in FIG. 2) as an input or a basis for intra prediction 254.

The loop filter unit (or loop filter) 220 is configured to filter the reconstructed block 215 to obtain a filtered block 221, to smooth pixel transitions or improve video quality. The loop filter unit 220 is intended to represent one or more loop filters including a de-blocking filter, a sample-adaptive offset (SAO) filter, and other filters, for example, a bilateral filter, an adaptive loop filter (ALF), a sharpening or smoothing filter, or a collaborative filter. Although the loop filter unit 220 is shown in FIG. 2 as an in loop filter, in other configurations, the loop filter unit 220 may be implemented as a post loop filter. The filtered block 221 may also be referred to as a filtered reconstructed block 221. The decoded picture buffer 230 may store the reconstructed encoded blocks after the loop filter unit 220 performs filtering operations on the reconstructed encoded blocks.

One embodiment of the encoder 20 (correspondingly, the loop filter unit 220) may be configured to output a loop filter parameter (such as sample adaptive offset information), for example, directly or after entropy encoding performed by the entropy encoding unit 270 or any other entropy encoding unit, so that, for example, the decoder 30 can receive the same loop filter parameter and apply the same loop filter parameter to decoding.

DPB 230 may be a reference picture memory that stores reference picture data for use in video data encoding by the encoder 20. The DPB 230 may be formed by any one of a variety of memory devices, such as a DRAM (including a synchronous DRAM (SDRAM), a magnetoresistive RAM (MRAM), and a resistive RAM (RRAM)), or other types of memory devices. The DPB 230 and the buffer 216 may be provided by a same memory device or separate memory devices. In one embodiment, DPB 230 is configured to store the filtered block 221. The DPB 230 may be further configured to store other previously filtered blocks, for example, previously reconstructed and filtered blocks 221, of the same current picture or of different pictures, for example, previously reconstructed pictures, and may provide complete previously reconstructed, that is, decoded pictures (and corresponding reference blocks and samples) and/or a partially reconstructed current picture (and corresponding reference blocks and samples), for example, for inter prediction. In one embodiment, if the reconstructed block 215 is reconstructed without in-loop filtering, the DPB 230 is configured to store the reconstructed block 215.

The prediction processing unit 260, also referred to as a block prediction processing unit 260, is configured to receive or obtain picture block 203 (e.g., a current picture block 203 of the current picture 201) and reconstructed picture data, for example, reference samples of the same (or current) picture from the buffer 216 and/or reference picture data 231 of one or more previously decoded pictures from the decoded picture buffer 230, and to process such data for prediction, that is, to provide the prediction block 265 that may be an inter-predicted block 245 or an intra-predicted block 255.

The mode selection unit 262 may be configured to select a prediction mode (for example, an intra or inter prediction mode) and/or a corresponding prediction block 245 or 255 to be used as the prediction block 265, for calculation of the residual block 205 and for reconstruction of the reconstructed block 215.

In one embodiment, mode selection unit 262 may be configured to select the prediction mode (for example, from prediction modes supported by the prediction processing unit 260), where the prediction mode provides an optimal match, in other words, a minimum residual (the minimum residual means better compression for transmission or storage), or provides minimum signaling overheads (the minimum signaling overheads mean better compression for transmission or storage), or considers or balances both. The mode selection unit 262 may be configured to determine the prediction mode based on rate-distortion optimization (RDO), that is, select a prediction mode that provides minimum rate-distortion optimization or select a prediction mode for which related rate distortion at least satisfies a prediction mode selection criterion.

In the following, prediction processing performed (for example, by using the prediction processing unit 260) and mode selection performed (for example, by using the mode selection unit 262) by an example of the encoder 20 are described in more detail.

As described above, the encoder 20 is configured to determine or select the optimal or optimum prediction mode from a set of prediction modes (which may be predetermined). The set of prediction modes may include, for example, intra prediction modes and/or inter prediction modes.

A set of intra prediction modes may include 35 different intra prediction modes, for example, non-directional modes such as a DC (or mean) mode and a planar mode, or directional modes such as those defined in H.265, or may include 67 different intra prediction modes, for example, non-directional modes such as a DC (or mean) mode and a planar mode, or directional modes such as those defined in H.266 under development.

In one embodiment, a set of inter prediction modes depends on available reference pictures (that is, for example, at least partially decoded pictures stored in the DPB 230, as described above) and other inter prediction parameters, for example, depends on whether the entire reference picture or only a part of the reference picture, for example, a search window area around an area of the current block, is used for searching for an optimal matching reference block, and/or for example, depends on whether pixel interpolation such as half/semi-pel and/or quarter-pel interpolation is applied. The set of inter prediction modes may include, for example, an advanced motion vector predictor (AMVP) mode and a merge mode. In one embodiment, the set of inter prediction modes may include an AMVP mode based on a control point and a merge mode based on a control point that are improved in the embodiments of the present disclosure. In one example, the intra prediction unit 254 may be configured to perform any combination of intra prediction techniques described below.

In addition to the foregoing prediction modes, a skip mode and/or a direct mode may be also applied in the embodiments of the present disclosure.

The prediction processing unit 260 may be further configured to partition the picture block 203 into smaller block partitions or sub-blocks, for example, by iteratively using quadtree (QT) partitioning, binary-tree (BT) partitioning, triple-tree (TT) partitioning, or any combination thereof, and to perform, for example, prediction on each of the block partitions or sub-blocks, where mode selection includes selection of a tree structure of the partitioned picture block 203 and prediction modes applied to each of the block partitions or sub-blocks.

The inter prediction unit 244 may include a motion estimation (ME) unit (not shown in FIG. 2) and a motion compensation (MC) unit (also not shown in FIG. 2). The motion estimation unit is configured to receive or obtain picture block 203 (e.g., current picture block 203 of the current picture 201) and a decoded picture 231, or at least one or more previously reconstructed blocks, for example, reconstructed blocks of one or more other/different previously decoded pictures 231, for motion estimation. For example, a video sequence may include the current picture and the previously decoded pictures 31, or in other words, the current picture and the previously decoded pictures 31 may be a part of or form a sequence of pictures forming a video sequence.

For example, encoder 20 may be configured to select a reference block from a plurality of reference blocks of a same picture or different pictures of a plurality of other pictures and provide, to the motion estimation unit (not shown in FIG. 2), a reference picture and/or provide an offset (a spatial offset) between a position (coordinates X and Y) of the reference block and a position of the current block as an inter prediction parameter. This offset is also referred to as a motion vector (MV).

The motion compensation unit is configured to obtain the inter prediction parameter, and perform inter prediction based on or by using the inter prediction parameter, to obtain the inter-predicted block 245. Motion compensation performed by the motion compensation unit (not shown in FIG. 2) may include fetching or generating the prediction block based on a motion/block vector determined through motion estimation (possibly performing interpolations for sub-pixel precision). Interpolation filtering may generate additional pixel samples from known pixel samples, thereby potentially increasing a quantity of candidate prediction blocks that may be used to code a picture block. Upon receiving a motion vector for a PU of the current picture block, the motion compensation unit 246 may locate a prediction block to which the motion vector points in one reference picture list. The motion compensation unit 246 may further generate syntax elements associated with blocks and video slices, for use by the decoder 30 in decoding picture blocks of the video slice.

In one embodiment, the inter prediction unit 244 may transmit the syntax elements to the entropy encoding unit 270, and the syntax elements include the inter prediction parameter (such as indication information of selection of an inter prediction mode used for prediction of the current block after traversal of a plurality of inter prediction modes). In one embodiment, if there is only one inter prediction mode, the inter prediction parameter may be alternatively not carried in the syntax elements. In this case, the decoder side 30 may perform decoding directly in a default prediction mode. It can be understood that the inter prediction unit 244 may be configured to perform any combination of inter prediction techniques.

The intra prediction unit 254 is configured to obtain, for example, receive, the picture block 203 (the current picture block) and one or more previously reconstructed blocks, for example, reconstructed neighboring blocks, of the same picture for intra estimation. The encoder 20 may be, for example, configured to select an intra prediction mode from a plurality of intra prediction modes (which may be predetermined).

In one embodiment, encoder 20 may be configured to select the intra prediction mode based on an optimization criterion, for example, based on a minimum residual (for example, an intra prediction mode providing the prediction block 255 that is most similar to the current picture block 203) or minimum rate distortion.

The intra prediction unit 254 is further configured to determine, based on an intra prediction parameter, for example, the selected intra prediction mode, the intra prediction block 255. In any case, after selecting an intra prediction mode for a block, the intra prediction unit 254 is further configured to provide the intra prediction parameter, that is, information indicating the selected intra prediction mode for the block, to the entropy encoding unit 270. In one example, the intra prediction unit 254 may be configured to perform any combination of intra prediction techniques.

In one embodiment, intra prediction unit 254 may transmit the syntax elements to the entropy encoding unit 270, and the syntax elements include the intra prediction parameter (such as indication information of selection of an intra prediction mode used for prediction of the current block after traversal of a plurality of intra prediction modes). In one embodiment, if there is only one intra prediction mode, the intra prediction parameter may be alternatively not carried in the syntax elements. In this case, the decoder side 30 may perform decoding directly in a default prediction mode.

The entropy encoding unit 270 is configured to apply an entropy encoding algorithm or scheme (for example, a variable length coding (VLC) scheme, a context adaptive VLC (CAVLC) scheme, an arithmetic coding scheme, context adaptive binary arithmetic coding (CABAC), syntax-based context-adaptive binary arithmetic coding (SBAC), probability interval partitioning entropy (PIPE) coding, or another entropy encoding method or technique) to the quantized residual coefficients 209, the inter prediction parameter, the intra prediction parameter, and/or the loop filter parameter individually or jointly (or not at all) to obtain encoded picture data 21 that can be output by an output 272, for example, in a form of an encoded bitstream 21. The encoded bitstream may be transmitted to the video decoder 30, or archived for later transmission or retrieval by the video decoder 30. The entropy encoding unit 270 may be further configured to entropy encode other syntax elements for a current video slice being encoded.

Other structural variations of the video encoder 20 can be used to encode a video stream. For example, a non-transform based encoder 20 may quantize a residual signal directly without the transform processing unit 206 for some blocks or frames. In another embodiment, the encoder 20 may have the quantization unit 208 and the inverse-quantization unit 210 combined into a single unit.

In one embodiment, the encoder 20 can be configured to implement an inter prediction method described in the following embodiment.

It should be understood that other structural variations of the video encoder 20 can be used to encode a video stream. For example, for some picture blocks or image frames, the video encoder 20 may quantize the residual signal directly without processing by the transform processing unit 206, and correspondingly, without processing by the inverse-transform processing unit 212. Alternatively, for some picture blocks or image frames, the video encoder 20 does not generate residual data, and correspondingly, there is no need for the transform processing unit 206, the quantization unit 208, the inverse-quantization unit 210, and the inverse-transform processing unit 212 to perform processing. Alternatively, the video encoder 20 may directly store a reconstructed picture block as a reference block, without processing by the filter 220. Alternatively, the quantization unit 208 and the inverse-quantization unit 210 in the video encoder 20 may be combined together. The loop filter 220 is optional in some embodiments, and in a case of lossless compression coding, the transform processing unit 206, the quantization unit 208, the inverse-quantization unit 210, and the inverse-transform processing unit 212 can be optional. It should be understood that in different application scenarios, the inter prediction unit 244 and the intra prediction unit 254 may be enabled selectively.

FIG. 3 is a schematic/conceptual block diagram of an example of a decoder according to one embodiment. Referring to FIG. 3, video decoder 30 is configured to receive encoded picture data (for example, an encoded bitstream) 21, for example, encoded by the encoder 20, to obtain a decoded picture 231. In a decoding process, the video decoder 30 receives video data, for example, an encoded video bitstream that represents picture blocks of an encoded video slice and associated syntax elements, from the video encoder 20.

In the example of FIG. 3, the decoder 30 includes an entropy decoding unit 304, an inverse-quantization unit 310, an inverse-transform processing unit 312, a reconstruction unit 314 (for example, a summer 314), a buffer 316, a loop filter 320, a decoded picture buffer 330, and a prediction processing unit 360. The prediction processing unit 360 may include an inter prediction unit 344, an intra prediction unit 354, and a mode selection unit 362. In some examples, the video decoder 30 may perform a decoding pass generally reciprocal to the encoding pass described with reference to the video encoder 20 in FIG. 2.

The entropy decoding unit 304 is configured to perform entropy decoding on the encoded picture data 21 to obtain, for example, quantized coefficients 309 and/or decoded encoding parameters (not shown in FIG. 3), for example, any one or all of an inter prediction parameter, an intra prediction parameter, a loop filter parameter, and/or other syntax elements (that are decoded). The entropy decoding unit 304 is further configured to forward the inter prediction parameter, the intra prediction parameter, and/or the other syntax elements to the prediction processing unit 360. The video decoder 30 may receive syntax elements at a video slice level and/or a video block level.

The inverse-quantization unit 310 may have a same function as the inverse-quantization unit 110, the inverse-transform processing unit 312 may have a same function as the inverse-transform processing unit 212, the reconstruction unit 314 may have a same function as the reconstruction unit 214, the buffer 316 may have a same function as the buffer 216, the loop filter 320 may have a same function as the loop filter 220, and the decoded picture buffer 330 may have a same function as the decoded picture buffer 230.

The prediction processing unit 360 may include the inter prediction unit 344 and the intra prediction unit 354, where the inter prediction unit 344 may resemble the inter prediction unit 244 in function, and the intra prediction unit 354 may resemble the intra prediction unit 254 in function. The prediction processing unit 360 is generally configured to perform block prediction and/or obtain a prediction block 365 from the encoded data 21, and receive or obtain (explicitly or implicitly) prediction-related parameters and/or information about a selected prediction mode, for example, from the entropy decoding unit 304.

When the video slice is encoded as an intra-encoded (I) slice, the intra prediction unit 354 of the prediction processing unit 360 is configured to generate the prediction block 365 for a picture block of the current video slice based on a signaled intra prediction mode and data that is from previously decoded blocks of a current frame or picture. When the video frame is encoded as an inter-encoded (that is, B or P) slice, the inter prediction unit 344 (for example, a motion compensation unit) of the prediction processing unit 360 is configured to generate the prediction block 365 for a video block of the current video slice based on a motion vector and other syntax elements received from the entropy decoding unit 304. For inter prediction, the prediction block may be generated from one of reference pictures in one reference picture list. The video decoder 30 may construct reference frame lists, a list 0 and a list 1, by using a default construction technique based on reference pictures stored in the DPB 330.

The prediction processing unit 360 is configured to determine prediction information for a video block of the current video slice by parsing the motion vector and the other syntax elements, and use the prediction information to generate the prediction block for the current video block being decoded. In one example of the present disclosure, the prediction processing unit 360 uses some of the received syntax elements to determine a prediction mode (for example, intra or inter prediction) used for encoding video blocks of the video slice, an inter prediction slice type (for example, a B slice, a P slice, or a GPB slice), construction information for one or more of the reference picture lists for the slice, a motion vector for each inter-encoded video block of the slice, an inter prediction status for each inter-encoded video block of the slice, and other information, to decode the video blocks in the current video slice. In another embodiment, the syntax elements received by the video decoder 30 from a bitstream include syntax elements in one or more of an adaptive parameter set (APS), a sequence parameter set (SPS), a picture parameter set (PPS), or a slice header.

The inverse-quantization unit 310 may be configured to inversely quantize (that is, de-quantize) quantized transform coefficients provided in the bitstream and decoded by the entropy decoding unit 304. An inverse quantization process may include: using a quantization parameter calculated by the video encoder 20 for each video block in the video slice, to determine a quantization degree that should be applied and, likewise, an inverse-quantization degree that should be applied.

The inverse-transform processing unit 312 is configured to apply an inverse transform (for example, an inverse DCT, an inverse integer transform, or a conceptually similar inverse transform process) to the transform coefficients to generate residual blocks in a pixel domain.

The reconstruction unit 314 (for example, the summer 314) is configured to add an inverse transform block 313 (that is, a reconstructed residual block 313) to the prediction block 365 to obtain a reconstructed block 315 in a sample domain, for example, by adding sample values of the reconstructed residual block 313 and sample values of the prediction block 365.

The loop filter unit 320 (in a coding loop or after a coding loop) is configured to filter the reconstructed block 315 to obtain a filtered block 321, to smooth pixel transitions or improve video quality. In one example, the loop filter unit 320 may be configured to perform any combination of filtering techniques described below. The loop filter unit 320 is intended to represent one or more loop filters including a de-blocking filter, a sample-adaptive offset (SAO) filter, and other filters, for example, a bilateral filter, an adaptive loop filter (ALF), a sharpening or smoothing filter, or a collaborative filter. Although the loop filter unit 320 is shown in FIG. 3 as an in loop filter, in other configurations, the loop filter unit 320 may be implemented as a post loop filter.

The decoded video blocks 321 in a given frame or picture are then stored in the decoded picture buffer 330 that stores reference pictures used for subsequent motion compensation.

The decoder 30 is configured to, for example, output the decoded picture 31 by using an output 332, for presentation to a user or viewing by a user.

Other variations of the video decoder 30 may be configured to decode a compressed bitstream. For example, the decoder 30 may generate an output video stream without the loop filter unit 320. For example, a non-transform based decoder 30 may inversely quantize a residual signal directly without the inverse-transform processing unit 312 for some blocks or frames. In another embodiment, the video decoder 30 may have the inverse-quantization unit 310 and the inverse-transform processing unit 312 combined into a single unit.

In one embodiment, decoder 30 is configured to implement an inter prediction method described in the following embodiment.

It should be understood that other structural variations of the video decoder 30 may be configured to decode an encoded video bitstream. For example, the video decoder 30 may generate an output video stream without processing by the filter 320. Alternatively, for some picture blocks or image frames, the entropy decoding unit 304 of the video decoder 30 does not obtain quantized coefficients through decoding, and correspondingly, there is no need for the inverse-quantization unit 310 and the inverse-transform processing unit 312 to perform processing. The loop filter 320 is optional in some embodiments, and in a case of lossless compression, the inverse-quantization unit 310 and the inverse-transform processing unit 312 can be optional. It should be understood that in different application scenarios, the inter prediction unit and the intra prediction unit may be enabled selectively.

It should be understood that on the encoder 20 and the decoder 30, a processing result for a procedure may be output to a next procedure after being further processed. For example, after a procedure such as interpolation filtering, motion vector derivation, or loop filtering, an operation such as clip or shift is further performed on a processing result of a corresponding procedure.

For example, a motion vector of a control point of the current picture block derived from a motion vector of a neighboring affine coded block may be further processed. This is not limited herein. For example, a value range of the motion vector is restricted to be within a specific bit depth. Assuming that an allowed bit depth of the motion vector is bitDepth, a motion vector range is from $-2^{(bitDepth-1)}$ to $2^{(bitDepth-1)}-1$, where the symbol "^" represents a power. If bitDepth is 16, a value range is from −32768 to 32767. If bitDepth is 18, a value range is from −131072 to 131071. The value range may be restricted in the following two manners.

Manner 1: Remove an overflowing high-order bit of a motion vector:

$$ux=(vx\pm 2^{bitDepth})\%2^{bitDepth}$$

$$vx=(ux>=2^{bitDepth-1})!(ux-2^{bitDepth}): ux$$

$$uy=(vy+2^{bitDepth})\%2^{bitDepth}$$

$$vy=(uy>=2^{bitDepth-1})?(uy-2^{bitDepth}):uy$$

For example, a value of vx is −32769, 32767 is obtained by using the foregoing formulas. A value is stored in a computer in a two's complement form, binary supplemental code of −32769 is 1,0111,1111,1111,1111 (17 bits), and the computer handles an overflow by discarding a high-order bit. Therefore, the value of vx is 0111,1111,1111,1111, that is, 32767, which is consistent with the result obtained through processing by using the formulas.

Manner 2: Perform clipping on a motion vector, as shown in the following formulas:

$$vx=\text{Clip3}(-2^{bitDepth-1},2^{bitDepth-1}-1,vx)$$

$$vy=\text{Clip3}(-2^{bitDepth-1},2^{bitDepth-1}-1,vy)$$

where Clip3 is defined to indicate clipping a value of z to a range [x, y]:

$$\text{Clip3}(x, y, z) = \begin{cases} x; & z < x \\ y; & z > y \\ z; & \text{otherwise} \end{cases}"$$

Figure 4:
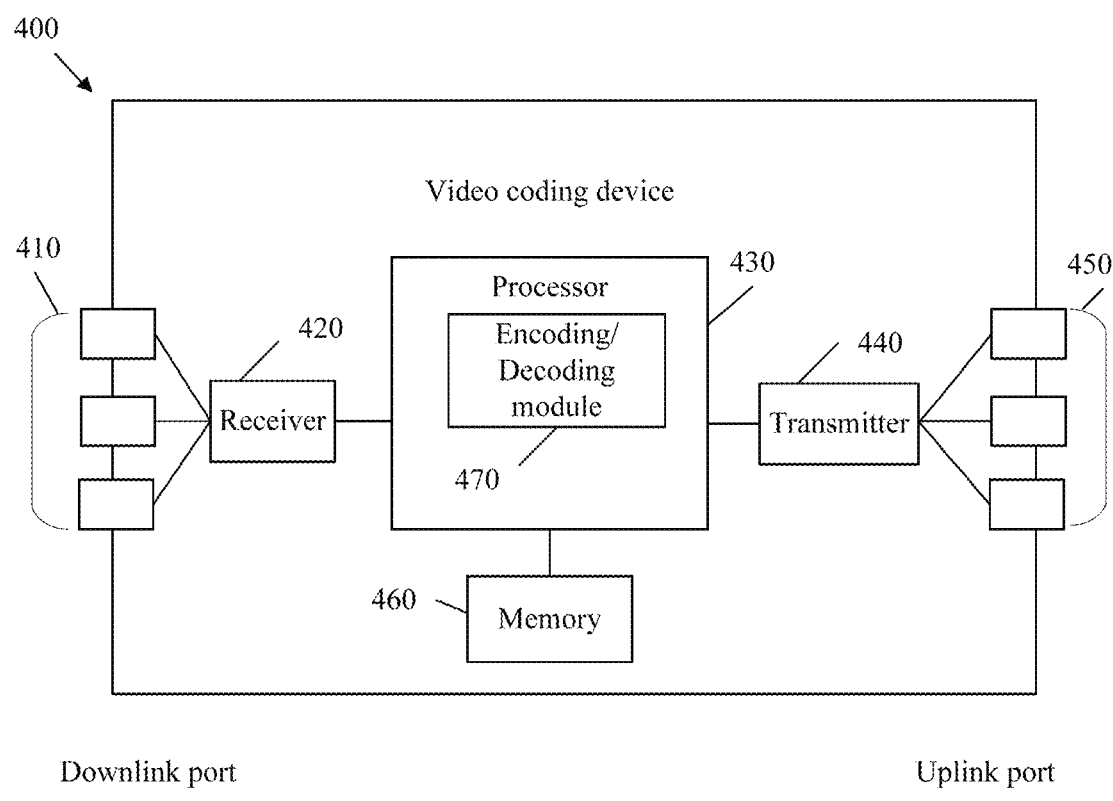
FIG. 4 is a block diagram of an example of a video coding device according to one embodiment.

FIG. 4 is a schematic structural diagram of a video coding device according to one embodiment. In FIG. 4, video coding device 400 (e.g., a video encoding device or a video decoding device) is suitable for implementing an embodiment described herein. In one embodiment, the video coding device 400 may be a video decoder (for example, the decoder 30 in FIG. 1A) or a video encoder (for example, the encoder 20 in FIG. 1A). In another embodiment, the video coding device 400 may be one or more components of the decoder 30 in FIG. 1A or the encoder 20 in FIG. 1A.

The video coding device 400 includes: ingress ports 410 and a receiver unit (Rx) 420 that are configured to receive data; a processor, a logic unit, or a central processing unit (CPU) 430 that are configured to process the data; a transmitter unit (Tx) 440 and egress ports 450 that are configured to transmit data; and a memory 460 configured to store the data. The video coding device 400 may further include optical-to-electrical components and electrical-to-optical (EO) components coupled to the ingress ports 410, the receiver unit 420, the transmitter unit 440, and the egress ports 450, for egress or ingress of optical or electrical signals.

The processor 430 is implemented by hardware and software. The processor 430 may be implemented as one or more CPU chips, cores (for example, a multi-core processor), FPGAs, ASICs, and DSPs. The processor 430 communicates with the ingress ports 410, the receiver unit 420, the transmitter unit 440, the egress ports 450, and the memory 460. The processor 430 includes a coding module 470 (for example, an encoding module or a decoding module). The coding module 470 implements the embodiments disclosed herein, and implements the chroma block prediction method provided in the embodiments of the present disclosure. For example, the coding module 470 implements, processes, or provides various coding operations. Therefore, inclusion of the coding module 470 provides a substantial improvement to functions of the video coding device 400 and affects a transformation of the video coding device 400 to a different state. Alternatively, the coding module 470 is implemented as instructions stored in the memory 460 and executed by the processor 430.

The memory 460 includes one or more disks, tape drives, and solid state drives and may be used as an overflow data storage device, to store programs when such programs are selectively executed, and to store instructions and data that are read during program execution. The memory 460 may be volatile and/or nonvolatile, and may be a ROM, a RAM, a ternary content-addressable memory (TCAM), and/or a static random access memory (SRAM).

Figure 5:
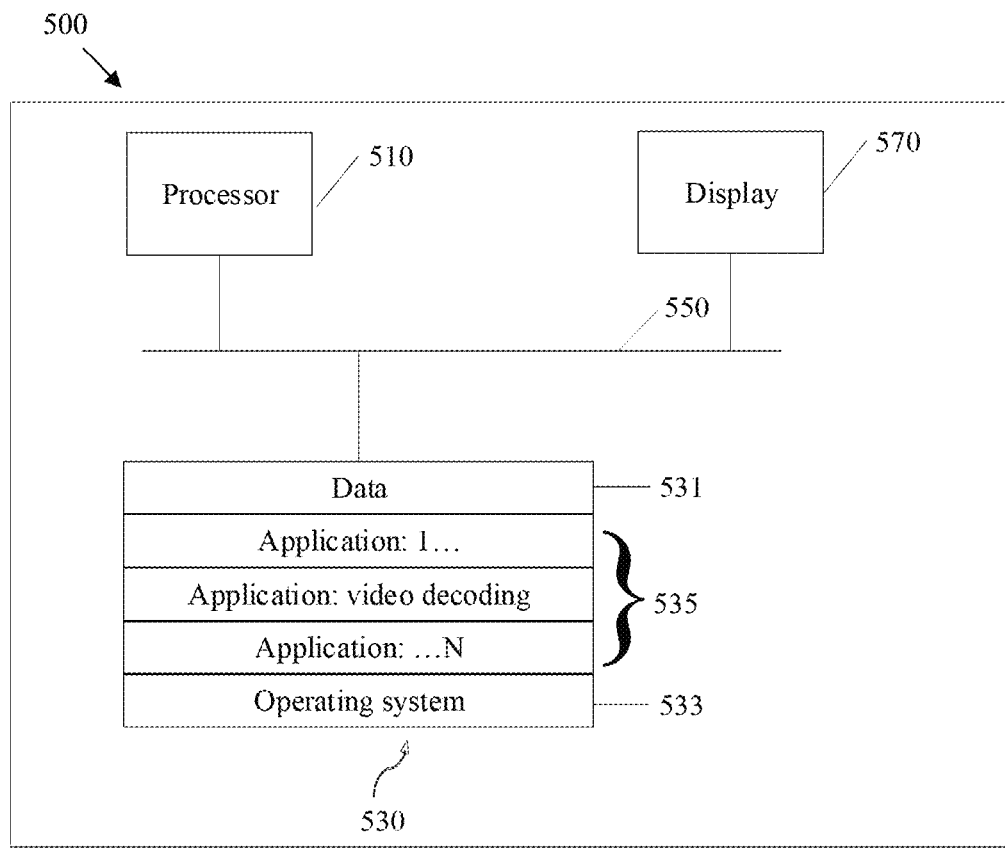
FIG. 5 is a block diagram of another example of an encoding apparatus or a decoding apparatus according to one embodiment.

FIG. 5 is a simplified block diagram of an apparatus according to one embodiment. In FIG. 5, apparatus 500 can be used as any one or two of the source device 12 and the destination device 14 in FIG. 1A according to one embodiment. The apparatus 500 can implement the techniques of this disclosure. In other words, FIG. 5 is a schematic block diagram of an embodiment of an encoding device or a decoding device (referred to as coding device) according to one embodiment. With continued reference to FIG. 5, coding device 500 may include a processor 510, a memory 530, and a bus system 550. The processor is connected to the memory by using the bus system, the memory is configured to store an instruction, and the processor is configured to execute the instruction stored in the memory. The memory of the coding device stores program code. The processor can invoke the program code stored in the memory, to perform the video encoding or decoding methods described herein, and in particular, various new inter prediction methods. To avoid repetition, details are not described herein again.

In one embodiment, the processor 510 may be a central processing unit (CPU), or the processor 510 may be another general purpose processor, a digital signal processor (DSP), an application-specific integrated circuit (ASIC), a field-programmable gate array (FPGA) or another programmable logic device, a discrete gate or transistor logic device, a discrete hardware component, or the like. The general purpose processor may be a microprocessor, or the processor may be any conventional processor or the like.

The memory 530 may include a read-only memory (ROM) device or a random access memory (RAM) device. Any other proper type of storage device may also be used as the memory 530. The memory 530 may include code and data 531 accessed by the processor 510 by using the bus 550. The memory 530 may further include an operating system 533 and an application program 535. The application program 535 includes at least one program that allows the processor 510 to perform the video encoding or decoding method (in particular, the inter prediction method described herein) described herein. For example, the application program 535 may include applications 1 to N, and further includes a video encoding or decoding application (referred to as video coding application) that performs the video encoding or decoding method described herein.

The bus system 550 may further include a power bus, a control bus, a status signal bus, and the like, in addition to a data bus. However, for clear description, various types of buses in the figure are marked as the bus system 550.

In one embodiment, the coding device 500 may further include one or more output devices, for example, a display 570. In an example, the display 570 may be a touch display that combines a display and a touch unit that operably senses touch input. The display 570 may be connected to the processor 510 by using the bus 550.

Forward prediction means selecting, for a current coding block, a reference picture from a forward reference picture set to obtain a reference block. Backward prediction means selecting, for the current coding block, a reference picture from a backward reference picture set to obtain a reference block. Bidirectional prediction means selecting a reference picture from each of the forward and backward reference picture sets to obtain a reference block. When a bidirectional prediction method is used, the current coding block has two reference blocks. Each reference block requires a motion vector and a reference frame index for an indication. Then, a prediction value of a pixel value of a pixel in the current block is determined based on pixel values of pixels in the two reference blocks.

An inter prediction mode may include but is not limited to an advanced motion vector predictor (AMVP) mode and a merge mode.

In the AMVP mode, a candidate motion vector list is first constructed by using motion information of a coded block that is spatially or temporally adjacent to the current coding block, an optimum motion vector is then determined from the candidate motion vector list as a motion vector predictor (MVP) of the current coding block. A rate-distortion cost is calculated by using a formula (1), where J is the rate-distortion cost RD Cost, SAD is a sum of absolute differences (SAD) between predicted pixel values and original pixel values that is obtained through motion estimation performed by using a candidate motion vector predictor, R is a bit rate, and λ is a Lagrange multiplier. An encoder side obtains and transfers, to a decoder side, an index value of the selected motion vector predictor in the candidate motion vector list and a reference frame index value. Further, a motion search is performed in a neighborhood centered at the MVP, to obtain an actual motion vector of the current coding block. The encoder side transfers a difference (e.g., motion vector difference) between the MVP and the actual motion vector to the decoder side.

$$J=SAD+\lambda R \quad (1)$$

Figure 6:
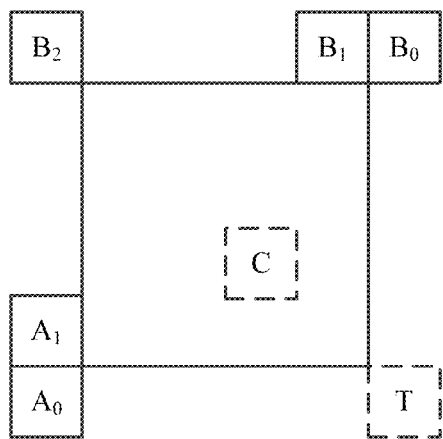
FIG. 6 is a schematic block diagram of spatial and temporal candidate motion information according to one embodiment.

In the merge mode, a candidate motion information list is first constructed by using motion information of a coded block that is spatially or temporally adjacent to the current coding block, optimum motion information is then determined from the candidate motion information list by using a rate-distortion cost, and is used as motion information of the current coding block, and an index value (denoted as a merge index) of a position of the optimum motion information in the candidate motion information list is then obtained and transferred to a decoder side. The merge index may be used to obtain the optimum motion information. Spatial and temporal candidate motion information of the current coding block is shown in FIG. 6, which is a schematic block diagram of spatial and temporal candidate motion information according to one embodiment. The spatial candidate motion information is from five spatially adjacent blocks (A0, A1, B0, B1, and B2). If an adjacent block is unavailable or is in an intra coding mode, the adjacent block is not added to the candidate motion information list. The temporal candidate motion information of the current coding block is obtained after an MV of a corresponding position block in a reference frame is scaled based on picture order counts (POC) of the reference frame and a current frame. Whether a block whose position in the reference frame is T is available is first determined. If the block is unavailable, a block whose position is C is selected.

The motion information includes at least one of reference picture information and a motion vector. The reference picture information may include at least one of the following: unidirectional/bidirectional prediction information, a reference picture list, and/or a reference picture index corresponding to the reference picture list. The motion vector refers to a positional shift in horizontal and vertical directions.

In a merge candidate list, a history-based motion vector predictor (HMVP) candidate set is introduced. Introduction of the HMVP is as follows:

An HMVP method for inter coding: In HMVP, a table of HMVP candidates is maintained and updated on-the-fly. After decoding a non-affine inter-coded block, the table is updated by adding associated new motion information as a new HMVP candidate to the last entry of the table. A constrained FIFO rule is applied to remove and add entries to the table. The HMVP candidates can be applied to either a merge candidate list or an AMVP candidate list.

In versatile video coding (VVC), motion vectors of non-affine inter-coded blocks can be signaled in two ways: an advanced motion vector predictor (AMVP) mode or a merge mode. For the AMVP mode, a difference between a real motion vector and a motion vector predictor (MVP), a reference index, and an MVP index referring to an AMVP candidate list are signaled. For the merge mode, a merge index referring to a merge candidate list is signaled and all motion information associated with the merge candidate is inherited.

Both the AMVP candidate list and the merge candidate list are derived from temporally or spatially neighboring coded blocks. In common test conditions, up to six merge candidates and up to two AMVP candidates may be added to the candidate list for motion vector predictor.

Figure 7:
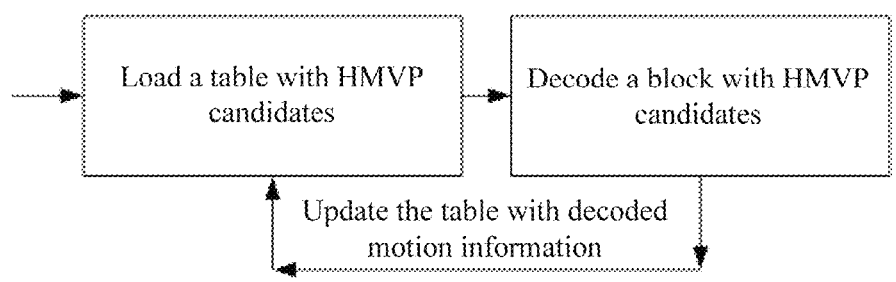
FIG. 7 is a schematic block diagram of a history-based motion vector predictor (HMVP) method flow according to one embodiment.

An HMVP candidate is defined as motion information of a previously coded block. A table with a plurality of HMVP candidates is maintained during encoding/decoding. The table is emptied when a new slice is encountered. Whenever there is an inter-coded non-affine block, associated motion information is added to the last entry of the table as a new HMVP candidate. An overall coding flow is depicted in FIG. 7.

Figure 8:
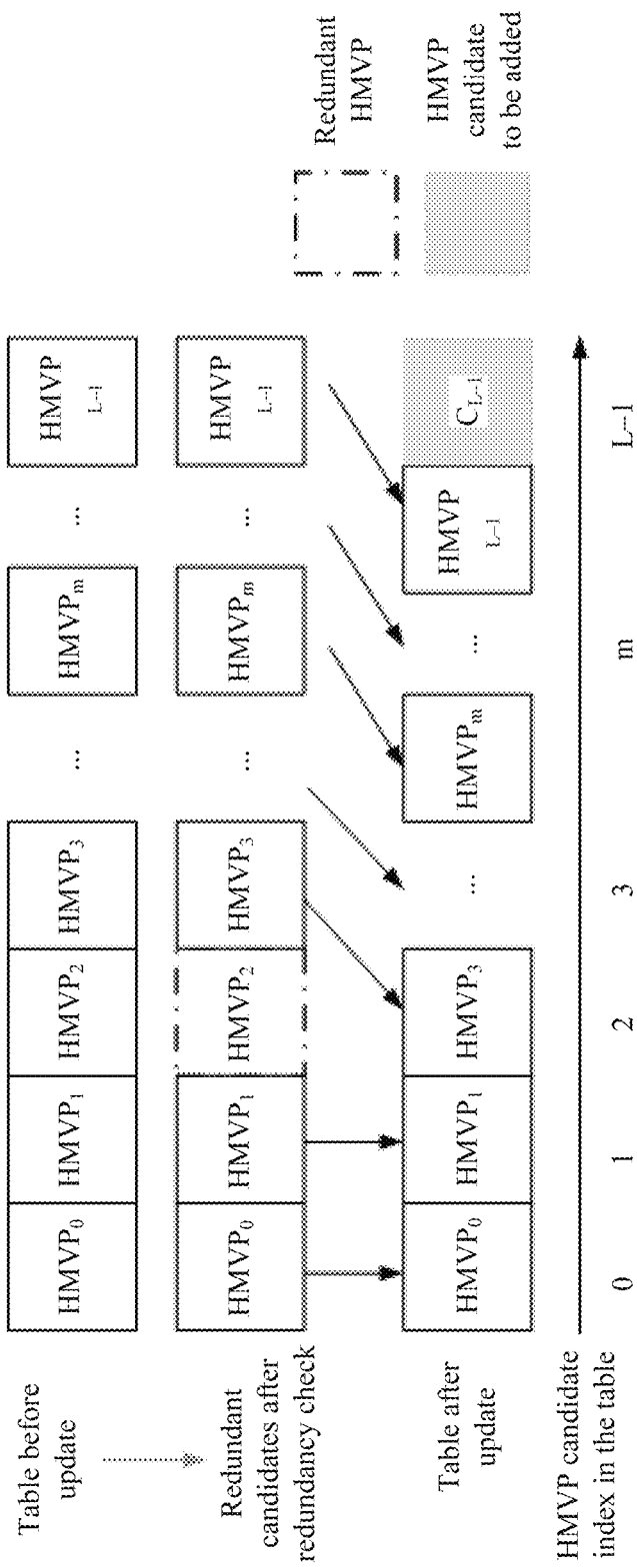
FIG. 8 is a schematic block diagram of a table update according to one embodiment.

In this contribution, referring now to FIG. 8 (which is a schematic block diagram of a table update according to one embodiment), a table size S is set to 6, which indicates that up to six HMVP candidates may be added to the table. When inserting a new motion candidate to the table, a constrained FIFO rule is utilized when redundancy check is firstly applied to find whether there is an identical HMVP in the table. If found, the identical HMVP is removed from the table and all HMVP candidates afterwards are moved forward, that is, with indices reduced by 1.

HMVP candidates can be used in a merge candidate list construction process. The latest several HMVP candidates in the table are checked in order and inserted into the candidate list after a TMVP candidate. Pruning is applied on the HMVP candidates to a spatial or temporal merge candidate excluding a sub-block motion candidate (that is, ATMVP).

To reduce a quantity of pruning operations, three simplifications are introduced:

1) A quantity of HMPV candidates to be check denoted by L is set as follows:

$$L=(N<=4)?M:(8-N) \qquad (1),$$

where N indicates a quantity of available non-sub-block merge candidates and M indicates a quantity of available HMVP candidates in the table.

2) In addition, once a total quantity of available merge candidates reaches a signaled maximally allowed quantity of merge candidates minus 1, the merge candidate list construction process from an HMVP list is terminated.

3) Moreover, a quantity of pairs for combined bi-predictive merge candidate derivation is reduced from 12 to 6.

Similarly, HMVP candidates can also be used in an AMVP candidate list construction process. Motion vectors of the last K HMVP candidates in the table are inserted after a TMVP candidate. Only HMVP candidates with a same reference picture as an AMVP target reference picture are used to construct an AMVP candidate list. Pruning is applied on the HMVP candidates. In this contribution, K is set to 4 while an AMVP list size is kept unchanged, that is, equal to 2.

HMVP candidates in the HMVP candidate set are filled in the merge candidate list until a quantity of candidates in the merge candidate list reaches the maximum quantity of candidates.

The history-based MVP (HMVP) merge candidates are added to merge list after the spatial MVP and TMVP. In this method, the motion information of a previously coded block is stored in a table and used as MVP for the current CU. The table with multiple HMVP candidates is maintained during the encoding/decoding process. The table is reset (emptied) when a new CTU row is encountered. Whenever there is a non-subblock inter-coded CU, the associated motion information is added to the last entry of the table as a new HMVP candidate.

The HMVP table size S is set to be 6, which indicates up to 6 HMVP candidates may be added to the table. When inserting a new motion candidate to the table, a constrained first-in-first-out (FIFO) rule is utilized wherein redundancy check is firstly applied to find whether there is an identical HMVP in the table. If found, the identical HMVP is removed from the table and all the HMVP candidates afterwards are moved forward, HMVP candidates could be used in the merge candidate list construction process. The latest several HMVP candidates in the table are checked in order and inserted to the candidate list after the TMVP candidate. Redundancy check is applied on the HMVP candidates to the spatial or temporal merge candidate.

To reduce the number of redundancy check operations, the following simplifications are introduced:

Number of HMPV candidates is used for merge list generation is set as (N<=4) ? M: (8-N), wherein N indicates number of existing candidates in the merge list and M indicates number of available HMVP candidates in the table.

Once the total number of available merge candidates reaches the maximally allowed merge candidates minus 1, the merge candidate list construction process from HMVP is terminated.

However, in the merge candidate list, a pairwise average candidate is also introduced. Introduction of the pairwise average candidate is as follows: Pairwise average candidates are generated by averaging predefined pairs of candidates in the current merge candidate list, and the predefined pairs are defined as {(0, 1), (0, 2), (1, 2), (0, 3), (1, 3), (2, 3)}, where the numbers denote merge indices to the merge candidate list. Averaged motion vectors are calculated separately for each reference list. If both motion vectors are available in one list, these two motion vectors are averaged even when they point to different reference pictures; if only one motion vector is available, the one motion vector is used directly; if no motion vector is available, this list keeps invalid. The pairwise average candidates replace combined candidates in the HEVC standard. A complexity analysis of pairwise average candidates is summarized in Table 1. For the worst case of additional calculations for averaging (the last column in Table 1), four additions and four shifts are needed for each pair (MVx and MVy in L0 and L1), and four reference index comparisons are needed for each pair (refIdx0 is valid and refIdx1 is valid in L0 and L1). There are six pairs, leading to 24 additions, 24 shifts, and 24 reference index comparisons in total. The combined candidates in the HEVC standard use two reference index comparisons for each pair (refIdx0 is valid in L0 and refIdx1 is valid in L1), and there are 12 pairs, leading to 24 reference index comparisons in total.

TABLE 1

Operation analysis for the pairwise average candidates

| Merge list size | Max quantity of potential candidates | Max quantity of candidate comparisons | Max quantity of MV scalings | Max quantity of temporal candidates | Additional local buffer | Max quantity of memory access | Others |
|---|---|---|---|---|---|---|---|
| 6, 8, 10 | 6 | 0 | 0 | 0 | 0 | 0 | Replace HEVC combined candidates, need additional calculations for averaging |

Pairwise average candidates are generated by averaging predefined pairs of candidates in the existing merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid.

When the merge list is not full after pair-wise average merge candidates are added, the zero MVPs are inserted in the end until the maximum merge candidate number is encountered.

Figure 9:
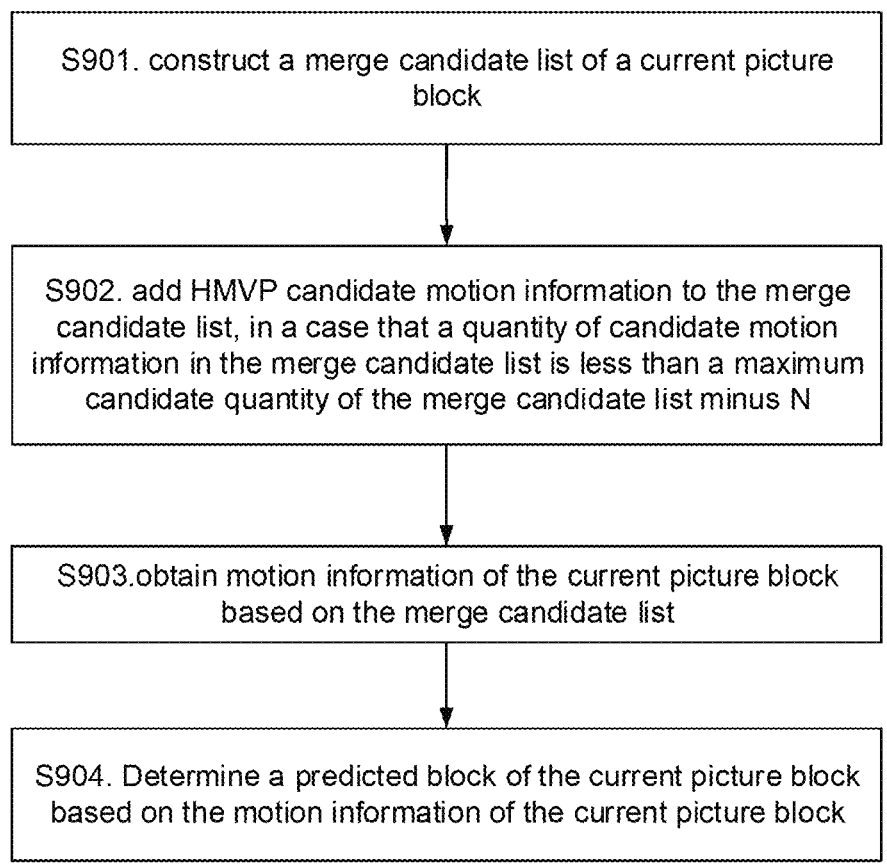
FIG. 9 is a schematic flowchart of an inter prediction method according to an embodiment.

FIG. 9 is a schematic flowchart of an inter prediction method according to an embodiment. The method of FIG. 9 enables a coder to process image blocks of which a size bigger than a preset size associated with the coder (such as a buffer size). The method can be implemented by hardware, software, or any combination thereof. The method can be implemented by inter prediction unit 244 or 344. The method can be a decoding method or an encoding method. As shown in FIG. 9, the method includes the following operations.

Operation S901. (A coder (such as encoder 20 or decoder 30 of FIG. 1) or video coding system) constructs a merge candidate list of a current picture block. The current picture block can be a coding block, a CU, a PU, or a TU, etc. The current picture block can be of any sizes and dimensions.

Operation S902. (The system) adds HMVP candidate motion information to the merge candidate list, in a case that a quantity of candidate motion information in the merge candidate list is less than a maximum candidate quantity of the merge candidate list minus N, wherein N is a positive integer.

Operation S903. (The system) obtains motion information of the current picture block based on the merge candidate list.

Operation S904. (The system) determines a predicted block of the current picture block based on the motion information of the current picture block.

In one embodiment, N may be 1, 2, or 3.

In one embodiment, the obtaining motion information of the current picture block based on the merge candidate list may comprise: obtaining a merge index of the current picture block or a merge index to the merge candidate list; obtaining motion information of the current picture block based on the merge candidate list and the merge index. Wherein the obtaining a merge index of the current picture block or a merge index to the merge candidate list may comprise: obtaining the merge index by parsing a bitstream. Wherein the obtaining motion information of the current picture block based on the merge candidate list and the merge index may comprise: the obtaining motion information from the merge candidate list by using the merge index. Wherein the merge index may be used to indicate the position of the motion information in the merger candidate list.

In one embodiment, the obtaining motion information of the current picture block based on the merge candidate list may comprise: determining the motion information from the merge candidate list using a rate-distortion cost. Wherein the method may further comprise: encoding a merge index to the merge candidate list in a bitstream.

In one embodiment, the predicted block can be termed a prediction block.

In one embodiment, the current picture block may be a coding block, a coding unit, or a prediction unit.

In one embodiment, the maximum candidate quantity of the merge candidate list can be termed a maximum number of merging motion vector predictor (MVP) candidates.

In one embodiment, the HMVP candidate motion information can be termed history-based merging candidates or history-based MVP (HMVP) merge candidates.

In one embodiment, the method further includes: adding pairwise average candidate motion information to the merge candidate list, in a case that a quantity of candidate motion information in the merge candidate list is equal to a maximum candidate quantity of the merge candidate list minus N.

In one embodiment, the pairwise average candidate motion information are generated by averaging a predefined pair of MVP candidates in the merge candidate list.

In one embodiment, the pairwise average candidate motion information can be termed a pairwise average candidate.

In one embodiment, in the merge candidate list, available candidates are imported into the list in a predetermined candidate scan order. When the merge candidate list does not reach the maximum candidate quantity of the merge list minus N (N≥1) after one HMVP candidate in the HMVP candidate set is imported into the merge list, an HMVP candidate in the HMVP candidate set continues to be imported into the merge list.

In another embodiment, in the merge candidate list, available candidates are imported into the list in a predetermined candidate scan order. When the merge candidate list does not reach the maximum candidate quantity of the merge list minus N (N≥1) after one HMVP candidate in the HMVP candidate set is imported into the merge list, an HMVP candidate in the HMVP candidate set continues to be imported into the merge list. When a quantity of candidates in the merge list is the maximum candidate quantity minus N (N≥1), the pairwise average candidate is imported into the merge list.

Based on a same inventive idea as the foregoing method, an embodiment of the present disclosure further provides an inter prediction apparatus, where the inter prediction apparatus includes a construction unit and a prediction block determining unit. It should be noted that the construction unit and the prediction block determining unit can be applied to an inter prediction process at an encoder side or a decoder side. At the encoder side, these units can be applied to the inter prediction unit 244 in the prediction processing unit 260 of the foregoing encoder 20; at the decoder side, these units can be applied to the inter prediction unit 344 in the prediction processing unit 360 of the foregoing decoder 30.

It should be further noted that for specific content of the motion information determining unit and the prediction block determining unit, refer to descriptions of the foregoing content including the Summary. For conciseness of this disclosure, details are not described herein again.

In one embodiment, the construction unit and the prediction unit can be implemented by hardware, software, or any combination thereof.

In one embodiment, the construction unit, configured to: construct a merge candidate list of a current picture block; add HMVP candidate motion information to the merge candidate list, in a case that a quantity of candidate motion information in the merge candidate list is less than a maximum candidate quantity of the merge candidate list minus N, wherein N is a positive integer; the prediction unit, configured to: obtain a merge index of the current picture block; obtain motion information of the current picture block based on the merge candidate list and the merge index; and determine a predicted block of the current picture block based on the motion information of the current picture block.

It should be further noted that for specific content of the motion information determining unit and the prediction block determining unit, refer to descriptions of the foregoing content including the Summary. For conciseness of this specification, details are not described herein again.

Following is an explanation of the applications of the encoding method as well as the decoding method as shown in the above-mentioned embodiments, and a system using them.

Figure 10:
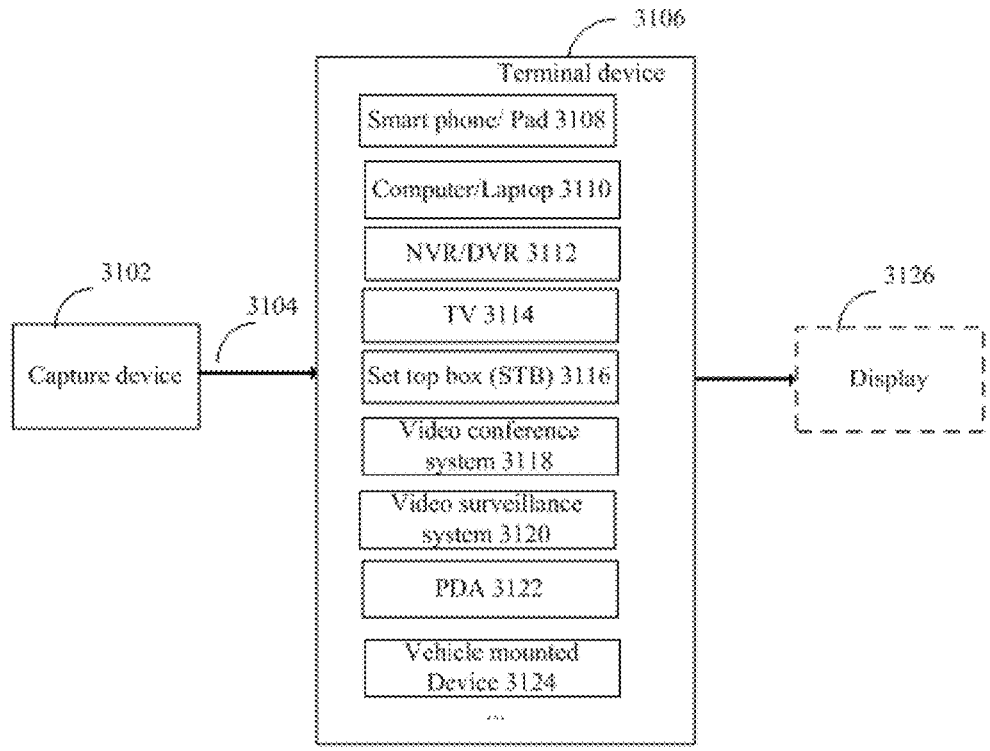
FIG. 10 is a block diagram showing an example structure of a content supply system for realizing a content delivery service.

FIG. 10 is a block diagram showing a content supply system for realizing content distribution service. In FIG. 10, content supply system 3100 includes capture device 3102, terminal device 3106, and optionally in some embodiments includes display 3126. The capture device 3102 communicates with the terminal device 3106 over communication link 3104. The communication link may include the communication channel 13 described above. The communication link 3104 includes but not limited to WIFI, Ethernet, Cable, wireless (3G/4G/5G), USB, or any kind of combination thereof, or the like.

The capture device 3102 generates data, and may encode the data by the encoding method as shown in the above embodiments. Alternatively, the capture device 3102 may distribute the data to a streaming server (not shown in the Figures), and the server encodes the data and transmits the encoded data to the terminal device 3106. The capture device 3102 includes but not limited to camera, smart phone or Pad, computer or laptop, video conference system, PDA, vehicle mounted device, or a combination of any of them, or the like. For example, the capture device 3102 may include the source device 12 as described above. When the data includes video, the video encoder 20 included in the capture device 3102 may actually perform video encoding processing. When the data includes audio (i.e., voice), an audio encoder included in the capture device 3102 may actually perform audio encoding processing. For some practical scenarios, the capture device 3102 distributes the encoded video and audio data by multiplexing them together. For other practical scenarios, for example in the video conference system, the encoded audio data and the encoded video data are not multiplexed. Capture device 3102 distributes the encoded audio data and the encoded video data to the terminal device 3106 separately.

In the content supply system 3100, the terminal device 310 receives and reproduces the encoded data. The terminal device 3106 could be a device with data receiving and recovering capability, such as smart phone or Pad 3108, computer or laptop 3110, network video recorder (NVR)/digital video recorder (DVR) 3112, TV 3114, set top box (STB) 3116, video conference system 3118, video surveillance system 3120, personal digital assistant (PDA) 3122, vehicle mounted device 3124, or a combination of any of them, or the like capable of decoding the above-mentioned encoded data. For example, the terminal device 3106 may include the destination device 14 as described above. When the encoded data includes video, the video decoder 30 included in the terminal device is prioritized to perform video decoding. When the encoded data includes audio, an audio decoder included in the terminal device is prioritized to perform audio decoding processing.

For a terminal device with its display, for example, smart phone or Pad 3108, computer or laptop 3110, network video recorder (NVR)/digital video recorder (DVR) 3112, TV 3114, personal digital assistant (PDA) 3122, or vehicle mounted device 3124, the terminal device can feed the decoded data to its display. For a terminal device equipped with no display, for example, STB 3116, video conference system 3118, or video surveillance system 3120, an external display 3126 is contacted therein to receive and show the decoded data.

When each device in this system performs encoding or decoding, the picture encoding device or the picture decoding device, as shown in the above-mentioned embodiments, can be used.

Figure 11:
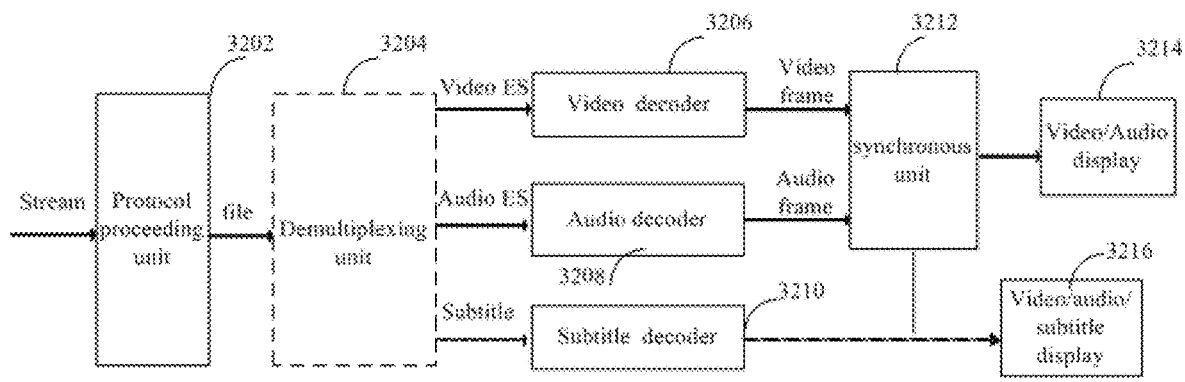
FIG. 11 is a block diagram showing a structure of an example of a terminal device.

FIG. 11 is a diagram showing a structure of an example of the terminal device 3106. After the terminal device 3106 receives stream from the capture device 3102, the protocol proceeding unit 3202 analyzes the transmission protocol of the stream. The protocol includes but not limited to Real Time Streaming Protocol (RTSP), Hyper Text Transfer Protocol (HTTP), HTTP Live streaming protocol (HLS), MPEG-DASH, Real-time Transport protocol (RTP), Real Time Messaging Protocol (RTMP), or any kind of combination thereof, or the like.

After the protocol proceeding unit 3202 processes the stream, stream file is generated. The file is outputted to a demultiplexing unit 3204. The demultiplexing unit 3204 can separate the multiplexed data into the encoded audio data and the encoded video data. As described above, for some practical scenarios, for example in the video conference system, the encoded audio data and the encoded video data are not multiplexed. In this situation, the encoded data is transmitted to video decoder 3206 and audio decoder 3208 without through the demultiplexing unit 3204.

Via the demultiplexing processing, video elementary stream (ES), audio ES, and optionally subtitle are generated. The video decoder 3206, which includes the video decoder 30 as explained in the above mentioned embodiments, decodes the video ES by the decoding method as shown in the above-mentioned embodiments to generate video frame, and feeds this data to the synchronous unit 3212. The audio decoder 3208, decodes the audio ES to generate audio frame, and feeds this data to the synchronous unit 3212. Alternatively, the video frame may store in a buffer (not shown in FIG. 11) before feeding it to the synchronous unit 3212. Similarly, the audio frame may store in a buffer (not shown in FIG. 11) before feeding it to the synchronous unit 3212.

The synchronous unit 3212 synchronizes the video frame and the audio frame, and supplies the video/audio to a video/audio display 3214. For example, the synchronous unit 3212 synchronizes the presentation of the video and audio information. Information may code in the syntax using time stamps concerning the presentation of coded audio and visual data and time stamps concerning the delivery of the data stream itself.

If subtitle is included in the stream, the subtitle decoder 3210 decodes the subtitle, and synchronizes it with the video frame and the audio frame, and supplies the video/audio/subtitle to a video/audio/subtitle display 3216.

The present disclosure is not limited to the above-mentioned system, and either the picture encoding device or the picture decoding device in the above-mentioned embodiments can be incorporated into other system, for example, a car system.

A person skilled in the art can understand that, the functions described with reference to various illustrative logical blocks, modules, and algorithm operations disclosed and described herein can be implemented by hardware, software, firmware, or any combination thereof. If implemented by software, the functions described with reference to the various illustrative logical blocks, modules, and operations may be stored in or transmitted over a computer-readable medium as one or more instructions or code and executed by a hardware-based processing unit. The computer-readable medium may include a computer-readable storage medium, which corresponds to a tangible medium such as a data storage medium, or a communication medium including any medium that facilitates transfer of a computer program from one place to another (for example, a communications protocol). In this manner, the computer-readable medium generally may correspond to (1) a tangible computer-readable storage medium that is non-transitory or (2) a communication medium such as a signal or a carrier. The data storage medium may be any available medium that can be accessed by one or more computers or one or more processors to retrieve instructions, code, and/or data structures for implementing the techniques described herein. A computer program product may include the computer-readable medium.

By way of example and not by way of limitation, such computer-readable storage media may include a RAM, a ROM, an EEPROM, a CD-ROM or another optical disk storage apparatus, a magnetic disk storage apparatus or another magnetic storage apparatus, a flash memory, or any other medium that can be used to store desired program code in a form of an instruction or a data structure and that can be accessed by a computer. In addition, any connection is properly termed a computer-readable medium. For example, if an instruction is transmitted from a website, server, or another remote source through a coaxial cable, a fiber optic cable, a twisted pair, a digital subscriber line (DSL), or wireless technologies such as infrared, radio, and microwave, the coaxial cable, fiber optic cable, twisted pair, DSL, or wireless technologies such as infrared, radio, and microwave are included in a definition of medium. However, it should be understood that the computer-readable storage medium and the data storage medium do not include connections, carriers, signals, or other transitory media, but actually means non-transitory tangible storage media. Disks and discs used herein include a compact disc (CD), a laser disc, an optical disc, a digital versatile disc (DVD), and a Blu-ray disc. The disks usually reproduce data magnetically, whereas the discs reproduce data optically with lasers. Combinations of the foregoing should also be included within the scope of the computer-readable medium.

An instruction may be executed by one or more processors such as one or more digital signal processors (DSP), general purpose microprocessors, application-specific integrated circuits (ASIC), field-programmable gate arrays (FPGA), or other equivalent integrated or discrete logic circuits. Therefore, the term "processor" used herein may refer to any of the foregoing structures or any other structures suitable for implementing the techniques described herein. In addition, in some aspects, the functions described with reference to the various illustrative logical blocks, modules, and operations described herein may be provided within dedicated hardware and/or software modules configured for encoding and decoding, or may be incorporated into a combined codec. In addition, the techniques may be fully implemented in one or more circuits or logic elements.

The techniques of this disclosure may be implemented in a wide variety of apparatuses or devices, including a wireless handset, an integrated circuit (IC), or a set of ICs (for example, a chip set). Various components, modules, or units are described herein to emphasize functional aspects of the apparatuses configured to perform the disclosed techniques, but are not necessarily implemented by different hardware units. Actually, as described above, various units may be combined, in combination with suitable software and/or firmware, into a codec hardware unit, or be provided by interoperative hardware units (including one or more processors described above).

In the foregoing embodiments, the descriptions of each embodiment have respective focuses. For a part that is not described in detail in an embodiment, refer to related descriptions in other embodiments.

The foregoing descriptions are merely examples of specific embodiments of this disclosure, but are not intended to limit the protection scope of this disclosure. Any variation or replacement readily figured out by a person skilled in the art within the technical scope disclosed herein shall fall within the protection scope of this disclosure. Therefore, the protection scope of this disclosure shall be subject to the protection scope of the claims.

The invention claimed is:

1. A method for inter prediction, the method comprising:
constructing a merging candidate list of a current picture block;
in response to determining that a number of merging candidates in the merging candidate list is less than a maximum number of candidates of the merging candidate list minus N, adding another history-based motion vector predictor (HMVP) candidate in an HMVP candidate set to the merging candidate list continuously after one HMVP candidate in the HMVP candidate set is added to the merging candidate list to obtain a first new merging candidate list, wherein N is a positive integer;
in response to determining that the number of merging candidates in the first new merging candidate list is equal to the maximum number of candidates of the merging candidate list minus N, adding a pairwise average merging candidate to the first new merging candidate list to obtain a second new merging candidate list;
in response to determining that the second new merging candidate list is not full after the pairwise average merging candidate is added, inserting zero motion vector predictors (MVPs) at an end of the second new merging candidate list until the maximum number of candidates of the merging candidate list is encountered to obtain a modified merging candidate list;
obtaining motion information of the current picture block based on the modified merging candidate list; and
determining a predicted block of the current picture block based on the motion information of the current picture block.

2. The method according to claim 1, wherein
obtaining the motion information of the current picture block comprises: generating the pairwise average merging candidate by averaging a predefined pair of merging candidates in the first new merging candidate list.

3. An apparatus for inter prediction, comprising:
processing circuitry that performs the method according to claim 1.

4. A non-transitory computer-readable medium, comprising:
an encoded bitstream obtained by performing the method of claim 1.

5. An apparatus for inter prediction, comprising:
a processor; and
a memory coupled to the processor to store instructions, which when executed by the processor, cause the processor to perform operations, the operations comprising:

constructing a merging candidate list of a current picture block;

in response to determining that a number of merging candidates in the merging candidate list is less than a maximum number of candidates of the merging candidate list minus N, adding another history-based motion vector predictor (HMVP) candidate in an HMVP candidate set to the merging candidate list continuously after one HMVP candidate in the HMVP candidate set is added to the merging candidate list to obtain a first new merging candidate list, wherein N is a positive integer;

in response to determining that the number of merging candidates in the first new merging candidate list is equal to the maximum number of candidates of the merging candidate list minus N, adding a pairwise average merging candidate to the first new merging candidate list to obtain a second new merging candidate list;

in response to determining that the second new merging candidate list is not full after the pairwise average merging candidate is added, inserting zero motion vector predictors (MVPs) at an end of the second new merging candidate list until the maximum number of candidates of the merging candidate list is encountered to obtain a modified merging candidate list;

obtaining motion information of the current picture block based on the modified candidate list; and determining a predicted block of the current picture block based on the motion information of the current picture block.

6. The apparatus according to claim 5, wherein obtaining the motion information of the current picture block comprises: generating the pairwise average merging candidate by averaging a predefined pair of merging candidates in the first new merging candidate list.

7. A non-transitory computer-readable medium having instructions stored therein, which when executed by a processor, cause the processor to perform operations, the operations comprising:

constructing a merging candidate list of a current picture block;

in response to determining that a number of merging candidates in the merging candidate list is less than a maximum number of candidates of the merging candidate list minus N, adding another history-based motion vector predictor (HMVP) candidate in an HMVP candidate set to the merging candidate list continuously after one HMVP candidate in the HMVP candidate set is added to the merging candidate list to obtain a first new merging candidate list, wherein Nis a positive integer;

in response to determining that the number of merging candidates in the first new merging candidate list is equal to the maximum number of candidates of the merging candidate list minus N, adding a pairwise average merging candidate to the first new merging candidate list to obtain a second new merging candidate list;

in response to determining that the second new merging candidate list is not full after the pairwise average merging candidate is added, inserting zero motion vector predictors (MVPs) at an end of the second new merging candidate list until the maximum number of candidates of the merging candidate list is encountered to obtain a modified merging candidate list;

obtaining motion information of the current picture block based on the modified candidate list; and determining a predicted block of the current picture block based on the motion information of the current picture block.

8. The non-transitory computer-readable medium according to claim 7, wherein obtaining the motion information of the current picture block comprises: generating the pairwise average merging candidate by averaging a predefined pair of merging candidates in the first new merging candidate list.

* * * * *

UNITED STATES PATENT AND TRADEMARK OFFICE
CERTIFICATE OF CORRECTION

| | | |
|---|---|---|
| PATENT NO. | : 12,132,891 B2 | Page 1 of 1 |
| APPLICATION NO. | : 18/365083 | |
| DATED | : October 29, 2024 | |
| INVENTOR(S) | : Xu Chen and Jianhua Zheng | |

It is certified that error appears in the above-identified patent and that said Letters Patent is hereby corrected as shown below:

In the Claims

In Claim 7, Column 38, Line 11, delete "Nis" and insert --N is--.

Signed and Sealed this
Fourteenth Day of January, 2025

Derrick Brent
*Acting Director of the United States Patent and Trademark Office*